(12) United States Patent
Ingvalson et al.

(10) Patent No.: US 10,932,409 B2
(45) Date of Patent: Mar. 2, 2021

(54) SYSTEM AND METHOD FOR OPERATING AN AUTONOMOUS ROBOTIC WORKING MACHINE WITHIN A TRAVELLING CONTAINMENT ZONE

(71) Applicant: THE TORO COMPANY, Bloomington, MN (US)

(72) Inventors: Ryan Douglas Ingvalson, Loretto, MN (US); Jason Thomas Kraft, Stillwater, MN (US); Alexander Steven Frick, Farmington, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 16/636,079

(22) PCT Filed: Nov. 7, 2018

(86) PCT No.: PCT/US2018/059573
§ 371 (c)(1),
(2) Date: Feb. 3, 2020

(87) PCT Pub. No.: WO2019/099253
PCT Pub. Date: May 23, 2019

(65) Prior Publication Data
US 2020/0267896 A1    Aug. 27, 2020

Related U.S. Application Data

(60) Provisional application No. 62/599,938, filed on Dec. 18, 2017, provisional application No. 62/588,680, filed on Nov. 20, 2017.

(51) Int. Cl.
*A01D 34/00*    (2006.01)
*G05D 1/02*    (2020.01)
(Continued)

(52) U.S. Cl.
CPC ......... *A01D 34/008* (2013.01); *G05D 1/0219* (2013.01); *G05D 1/0223* (2013.01);
(Continued)

(58) Field of Classification Search
CPC ......... G05D 2201/0208; G05D 1/0219; G05D 1/0265; G05D 1/0272; G05D 1/0274;
(Continued)

(56) References Cited

U.S. PATENT DOCUMENTS 6,240,342 B1 * 5/2001 Fiegert .................. B25J 9/1666
                                                    180/169
6,490,539 B1 * 12/2002 Dickson ............... A01B 69/008
                                                    180/168
(Continued)

FOREIGN PATENT DOCUMENTS

EP          3 056 960 A1    8/2016
WO    WO 2011/115534 A1    9/2011
(Continued)

OTHER PUBLICATIONS

International Search Report and Written Opinion dated Mar. 6, 2019 for International Patent Application No. PCT/US2018/059573 filed Nov. 7, 2018; 13 pages.
(Continued)

*Primary Examiner* — Redhwan K Mawari
(74) *Attorney, Agent, or Firm* — Mueting Raasch Group

(57) ABSTRACT

Apparatus, systems, and methods for directing an autonomous robotic vehicle such as a lawn mower relative to a work region. In some embodiments, the vehicle travels in a random pattern within a travelling containment zone of a lesser size than the work region. The travelling containment zone may move or travel across the work region such that, over time, the travelling containment zone travels over most all of a working surface of the work region.

21 Claims, 18 Drawing Sheets

(51) Int. Cl.
  *A01D 34/64* (2006.01)
  *A01D 101/00* (2006.01)
(52) U.S. Cl.
  CPC .......... *A01D 34/64* (2013.01); *A01D 2101/00* (2013.01); *G05D 2201/0208* (2013.01)
(58) Field of Classification Search
  CPC .. G05D 1/0212; G05D 1/0225; G05D 1/0278; G05D 1/0088; G05D 1/021; G05D 1/02; G05D 1/0268; B60L 2200/40; B60L 2240/421; B60L 15/20; B60L 2240/461; B60L 2240/62; G06F 16/29
  See application file for complete search history.

(56) References Cited

U.S. PATENT DOCUMENTS

| | | | |
|---|---|---|---|
| 7,343,230 B2 * | 3/2008 | McMurtry | A01B 79/005 172/2 |
| 8,428,776 B2 | 4/2013 | Letsky | |
| 8,706,297 B2 | 4/2014 | Letsky | |
| 9,026,302 B2 | 5/2015 | Stout et al. | |
| 9,188,983 B2 | 11/2015 | Stout et al. | |
| 9,363,945 B2 | 6/2016 | Jägenstedt et al. | |
| 9,516,806 B2 | 12/2016 | Yamauchi et al. | |
| 9,538,702 B2 | 1/2017 | Balutis et al. | |
| 2008/0183349 A1 | 7/2008 | Abramson et al. | |
| 2009/0182464 A1 * | 7/2009 | Myeong | G05D 1/0246 701/25 |
| 2012/0290165 A1 | 11/2012 | Ouyang | |
| 2013/0006419 A1 | 1/2013 | Bergström et al. | |
| 2014/0012453 A1 * | 1/2014 | Johnson | G05D 1/0219 701/23 |
| 2014/0324269 A1 * | 10/2014 | Abramson | G05D 1/0212 701/26 |
| 2015/0250097 A1 * | 9/2015 | Jagenstedt | G05D 1/0219 701/23 |
| 2015/0266475 A1 * | 9/2015 | Tanzmeister | B60W 30/0956 701/301 |
| 2016/0100522 A1 * | 4/2016 | Yamauchi | G05D 1/0236 701/25 |
| 2016/0227704 A1 * | 8/2016 | Yamamura | A01D 34/008 |
| 2016/0363933 A1 * | 12/2016 | Balutis | G05D 1/0274 |
| 2017/0108867 A1 * | 4/2017 | Franzius | G05D 1/0265 |
| 2017/0344012 A1 * | 11/2017 | Kamfors | G05D 1/0265 |
| 2019/0025851 A1 * | 1/2019 | Ebrahimi Afrouzi | G05D 1/0272 |
| 2019/0369640 A1 * | 12/2019 | He | G05D 1/0214 |
| 2020/0275604 A1 | 9/2020 | Chen et al. | |
| 2020/0275605 A1 | 9/2020 | Chen et al. | |

FOREIGN PATENT DOCUMENTS

| | | |
|---|---|---|
| WO | WO 2011/115563 A1 | 9/2011 |
| WO | WO 2014/058358 A1 | 4/2014 |
| WO | WO 2016/091312 A1 | 6/2016 |
| WO | WO 2016/097896 A1 | 6/2016 |
| WO | WO 2016/098023 A2 | 6/2016 |
| WO | WO 2016/098050 A1 | 6/2016 |
| WO | WO 2016/102141 A1 | 6/2016 |
| WO | WO 2016/103065 A1 | 6/2016 |
| WO | WO 2016/103066 A1 | 6/2016 |
| WO | WO 2019/096262 A1 | 5/2019 |
| WO | WO 2019/096263 A1 | 5/2019 |
| WO | WO 2019/096264 A1 | 5/2019 |

OTHER PUBLICATIONS

Galceran et al., "A Survey on Coverage Path Planning for Robotics" Robotics and Autonomous Systems, 2013; 61:1258-76.
Yang et al., "Vision-Based Localization and Mapping for an Autonomous Mower" 2013 IEEE/RSJ International Conference on Intelligent Robots and Systems, Tokyo, Japan. Nov. 3-7, 2013; 3655-62.
International Preliminary Report on Patentability, dated May 26, 2020 for International Patent Application No. PCT/US2018/059573 filed Nov. 7, 2018; 7 pages.

\* cited by examiner

SYSTEM AND METHOD FOR OPERATING AN AUTONOMOUS ROBOTIC WORKING MACHINE WITHIN A TRAVELLING CONTAINMENT ZONE

This application is a 35 U.S.C. § 371 U.S. National Stage of International Application No. PCT/US2018/059573, filed 7 Nov. 2018, which claims the benefit of U.S. Provisional Application No. 62/599,938, filed 18 Dec. 2017, and U.S. Provisional Application No. 62/588,680, filed 20 Nov. 2017, all of which are hereby incorporated by reference in their respective entireties.

The present disclosure relates to autonomous robotic working machines including vehicles such as lawn mowers and, more particularly, to methods and systems for controlling operation of such machines on a property or other work region.

BACKGROUND

Lawn and garden machines are known for performing a variety of tasks. For instance, powered lawn mowers are used by both homeowners and professionals alike to maintain grass areas within a property or yard.

Robotic lawn mowers that autonomously perform the grass cutting function are also known. Robotic lawn mowers are typically battery-powered and are often limited to cutting only a portion of the property before requiring re-charging, which typically requires the mower to return to a charging base station.

Robotic lawnmowers also generally cut grass in a random travel pattern within a fixed property boundary, wherein the boundary is defined by a continuous boundary marker, e.g., an energized wire laying on or buried beneath the lawn at the property boundary. Such boundary wires may also extend into the interior of the yard to demarcate obstacles (e.g., trees, flower beds, etc.) or other exclusion zones. The mower may then move randomly within the areas delineated by the boundary wire.

While effective, the random pattern of the mower combined with the variability of the boundary (i.e., shape of property lines, shape and size of obstacles, etc.) can create problems. For example, the mower may sometimes mow the same areas longer than needed, while missing areas not yet mowed. This occurs when the layout of the yard (e.g., the boundaries and excluded areas/obstacles), combined with the random pattern motion of the mower, leads to increased difficulty accessing certain areas (e.g., those areas of the yard having narrow entry passages). If the mower is unable to access these areas, such areas may be missed, reducing the perceived quality of cut. Conversely, when the mower is able to reach these areas, it may get unduly "hung-up," potentially extending the time it takes to complete the mowing task before requiring recharging.

SUMMARY

Embodiments described herein may provide a method of operating an autonomous working vehicle within a predefined work region, the method comprising: defining, with a controller associated with the working vehicle, a travelling containment zone that lies at least partially within the work region, the travelling containment zone defining a zone area that is less that an area of the work region; autonomously operating the working vehicle within the travelling containment zone; constraining a position of the working vehicle to be within the travelling containment zone; and moving the travelling containment zone across the work region while the working vehicle operates within the travelling containment zone.

In another embodiment, a method of operating an autonomous working vehicle within a predefined work region is provided, the method comprising: defining, with a controller associated with the working vehicle, a travelling containment zone that lies at least partially within the work region, the travelling containment zone defining a zone area that is less that an area of the work region; autonomously transporting the working vehicle from a location beyond the travelling containment zone to a location within the travelling containment zone; autonomously operating an implement attached to the working vehicle within the travelling containment zone; and moving the travelling containment zone across the work region while the working vehicle operates within the travelling containment zone.

In yet another embodiment, a mowing system is provided that includes an autonomously operating mower adapted to cut grass growing in a work region as the mower travels about the work region. The mower includes: a chassis supported upon a grass surface by ground support members, wherein one or more of the ground support members comprises a drive member; a grass cutting element attached to the chassis; a motor adapted to power the cutting element and the drive member; and a controller adapted to control the cutting element and a speed and direction of the drive member. The controller is further adapted to: identify a travelling containment zone at least partially within the work region, the travelling containment zone comprising a zone area that is less than an area of the work region; and constrain operation of the mower to be within both the travelling containment zone and the work region as the travelling containment zone travels across the work region.

In yet another embodiment, a method of operating an autonomous working vehicle within a predefined work region is provided, wherein the method includes defining, with a controller associated with the working vehicle, a travelling containment zone that lies at least partially within the work region, wherein the work region bounds a first plurality of grid cells and the travelling containment zone bounds a lesser second plurality of grid cells. The method further includes: autonomously operating the working vehicle within the travelling containment zone; constraining a position of the working vehicle to be within the travelling containment zone; moving the travelling containment zone across the work region while the working vehicle operates within the travelling containment zone; and deciding, with the controller, a direction in which to advance the travelling containment zone.

In still another embodiment, a method of operating an autonomous working vehicle within a predefined work region is provided. The method may include one or more of: defining, with an electronic controller associated with the working vehicle, a travelling containment zone that lies at least partially within the work region, the travelling containment zone defining a zone area that is less that an area of the work region; autonomously operating the working vehicle within the travelling containment zone; constraining a position of the working vehicle to be within the travelling containment zone; and moving the travelling containment zone across the work region while the working vehicle operates within the travelling containment zone. One or more aspects may be additionally included, in any combination, to produce yet additional embodiments. For example, the working vehicle may be configured as a lawn mower. In another aspect, the work region may comprise a grass surface of a property. In another aspect, a shape of the travelling containment zone may be varied as the travelling containment zone moves across the work region. In still another aspect, the method may further comprise moving the working vehicle in a random manner within the travelling containment zone. In yet another aspect, the method includes controlling a steering angle and a ground speed of the working vehicle with the controller. In yet another aspect, the method further includes maintaining an initial position of the travelling containment zone for a period of time before moving the travelling containment zone across the work region. In still yet another aspect, the method includes estimating, with the controller, a time at which operation of the working vehicle over the entire work region will be complete. In still another aspect, the method includes either: maintaining the zone area of the travelling containment zone constant as the travelling containment zone moves across the work region; or varying the zone area of the travelling containment zone as the travelling containment zone moves across the work region. In yet another aspect, the method includes either: maintaining a speed of the working vehicle while operating the working vehicle within the travelling containment zone; or varying a speed of the working vehicle while operating the working vehicle within the travelling containment zone. In yet another aspect, moving the travelling containment zone comprises moving the travelling containment zone at either: a constant rate or a variable rate.

In another embodiment, a mowing system is provided comprising an autonomously operating mower adapted to cut grass within a work region as the mower travels about the work region. In one aspect, the system may comprise one or more of: a chassis supported upon a grass surface by ground support members, wherein one or more of the ground support members comprises a drive member; a grass cutting element carried by the chassis; one or more motors adapted to power the cutting element and the drive member; and an electronic controller adapted to control operation of the cutting element and a speed and direction of the mower. The controller is adapted to: identify a travelling containment zone at least partially within the work region, the travelling containment zone comprising a zone area that is less than an area of the work region; and constrain operation of the mower to be within both the travelling containment zone and the work region as the travelling containment zone travels across the work region. One or more aspects may be additionally included, in any combination, to produce yet additional embodiments. For example, in one aspect, the controller may maintain an initial position of the travelling containment zone for a period of time before moving the travelling containment zone across the work region. In another aspect, the mower further comprises a positioning system adapted to estimate a position of the mower within the work region, wherein the positioning system is operatively connected to the controller. In yet another aspect, the system further comprises a base station located in or near the work region.

In still yet another embodiment, a method of operating an autonomous working vehicle within a predefined work region is provided. In one aspect, the method may comprise one or more of: defining, with an electronic controller associated with the working vehicle, a travelling containment zone that lies at least partially within the work region, wherein the work region bounds a first plurality of grid cells and the travelling containment zone bounds a lesser second plurality of grid cells; autonomously operating the working vehicle within the travelling containment zone; constraining a position of the working vehicle to be within the travelling containment zone; deciding, with the controller, a direction in which to advance a leading edge of the travelling containment zone; and moving the travelling containment zone across the work region while the working vehicle operates within the travelling containment zone. One or more aspects may be additionally included, in any combination, to produce yet additional embodiments. For example, in one aspect, deciding the direction to advance the travelling containment zone comprises scoring two or more grid cells, the two or more grid cells being externally adjacent to a boundary of the travelling containment zone. In another aspect, the scoring the two or more grid cells comprises evaluating a wavefront grid value of each cell of the two or more grid cells. In another aspect, scoring the two or more grid cells comprises comparing a distance from each cell of the two or more grid cells to a centroid of the travelling containment zone. In yet another aspect, the method further includes detecting bifurcation of the leading edge into at least a first segment and a second segment upon contact of the leading edge with an exclusion zone contained within the work area. In still another aspect, the method further comprises replacing the leading edge with either the first segment or the second segment. In still yet another aspect, moving the travelling containment zone comprises advancing a trailing edge of the travelling containment zone, while in another aspect, moving the travelling containment zone comprises adding grid cells from the first plurality of grid cells to the travelling containment zone. In yet another aspect, moving the travelling containment zone comprises removing grid cells from the travelling containment zone.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 3A-3K illustrate an exemplary method of operating a mower in another, more complex, work region, wherein: FIG. 3A illustrate an initial travelling containment zone at a time t=t1; FIG. 3B illustrates the travelling containment zone at a time t=t2; FIG. 3C illustrates the travelling containment zone at a time t=t3; FIG. 3D illustrates the travelling containment zone at a time t=t4; FIG. 3E illustrates the travelling containment zone at a time t=t5, wherein the travelling containment zone is shown moving around an exclusion zone to prevent bisecting the travelling containment zone; FIG. 3F illustrates the travelling containment zone at a time t=t6; FIG. 3G illustrates the travelling containment zone at a time t=t7; FIG. 3H illustrates the travelling containment zone at a time t=t8; FIG. 3I illustrates the travelling containment zone at a time t=t9; FIG. 3J illustrates the travelling containment zone at a time t=t10; and FIG. 3K illustrates the travelling containment zone at a time t=t11;

FIGS. 6A-6H illustrate an exemplary computer-simulated method of operating a mower within the work region shown in the map of FIG. 4, wherein: FIG. 6A illustrates a travelling containment zone at time t=t1; FIG. 6B illustrates the travelling containment zone at time t=t2, illustrating a leading edge of the travelling containment zone as it encounters an exclusion zone; FIG. 6C illustrates the travelling containment zone at time t=t3; FIG. 6D illustrates travelling containment zone at time t=t4; FIG. 6E illustrates the travelling containment zone at time t=t5; FIG. 6F illustrates the travelling containment zone at time t=t6 after the mower finished in the area shown in FIG. 6E and has relocated to a new starting area; and FIG. 6G illustrates the travelling containment zone at time t=t7 after the mower has again relocated to a new starting area; and FIG. 6H is an enlarged view of the travelling containment zone of FIG. 6B.

Figure 1A:
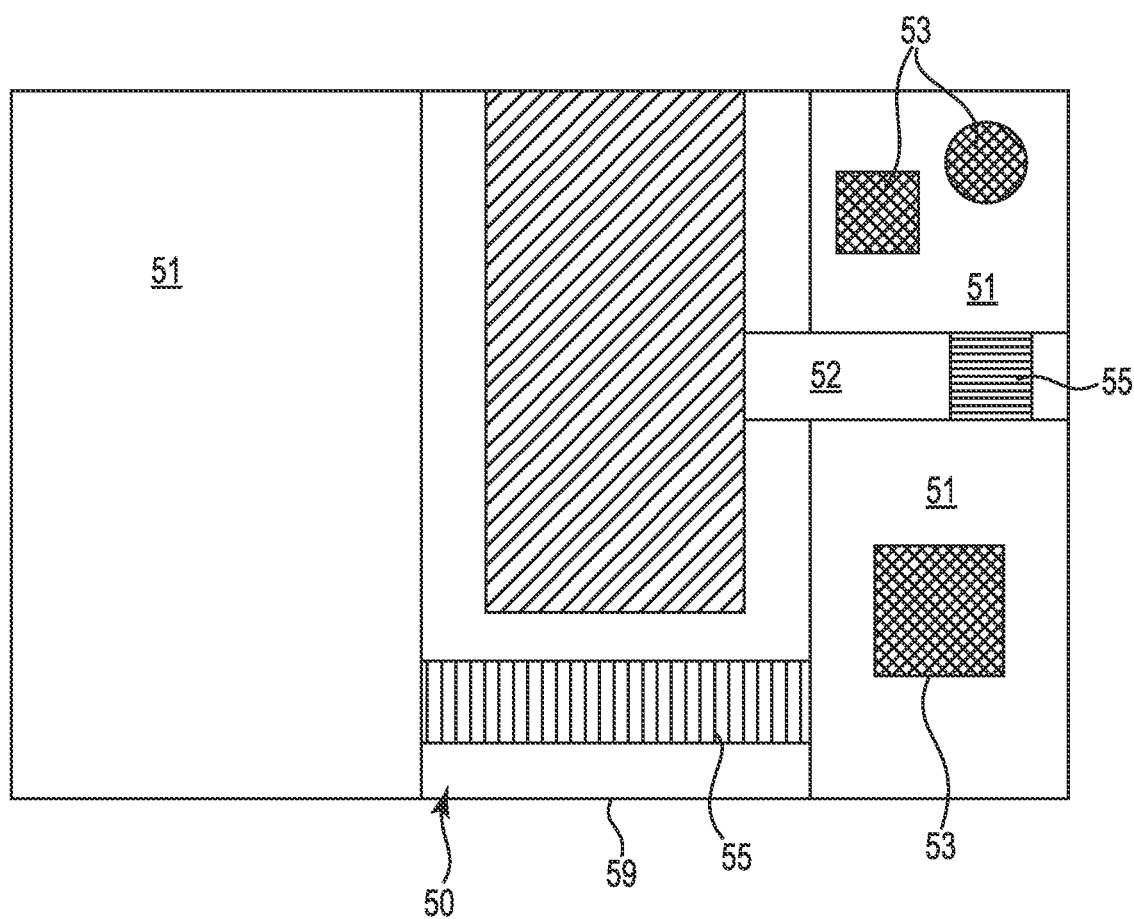
FIG. 1A illustrates an exemplary property defining work regions, exclusion zones, and transit zones in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for id est, and means "that is," while "e.g.," may be used as an abbreviation for exempli gratia, and means "for example."

Embodiments of the present disclosure provide autonomous robotic working vehicles and methods of operating the same within a predefined work region to achieve improved vehicle coverage (e.g., with an implement associated with the vehicle) of the work region during operation. For example, the vehicle may be an autonomous robotic mower adapted to cut grass, using an associated cutting member, on a working surface located within a work region (e.g., a turf (grass) surface of a residential or commercial property) as the mower travels across the work region. By implementing methods like those described and illustrated herein, such a mower may be able to achieve more efficient cutting coverage than may otherwise be provided with known random-travel coverage methods.

As used herein, "property" is defined as a geographic region (such as a yard) circumscribed by a fixed boundary within which the vehicle may perform work (e.g., mow grass). For example, FIG. 1A illustrates an exemplary property or yard 50 defined by a boundary 59. "Work region" (see areas labeled as "51" in FIG. 1A) is used herein to refer to those areas contained (or mostly contained) within the property boundary 59 within which the vehicle will perform work. For example, work regions could be defined by grass surfaces of the property or yard 50 upon which an autonomous lawn mower will operate. As further shown in FIG. 1A, a property may contain one or more work regions 51 including, for example, a front yard area and a back yard area, or two yard areas separated by a sidewalk or driveway 52. "Exclusion zone" is defined herein as an area contained within a work region in which the vehicle is not intended to operate (e.g., not intended to mow grass). Examples of exclusion zones include landscaped areas and gardens such as areas 53 shown in FIG. 1A, pools, buildings, driveways (see, e.g., driveway 52), and other yard features. "Transit zones" (see transit zones 55 in FIG. 1A) may be used herein to refer to paths the vehicle may take when travelling between different work regions of the property. Typically, the vehicle will not perform work when moving through a transit zone.

While described herein as a robotic mower, such a configuration is exemplary only as systems and methods described herein also have application to other autonomously operated machines/vehicles including, for example, commercial mowing products, other ground working vehicles (e.g., debris blowers/vacuums, aerators, material spreaders, snow throwers), as well as indoor working vehicles such as vacuums and floor scrubbers/cleaners.

Figure 1B:
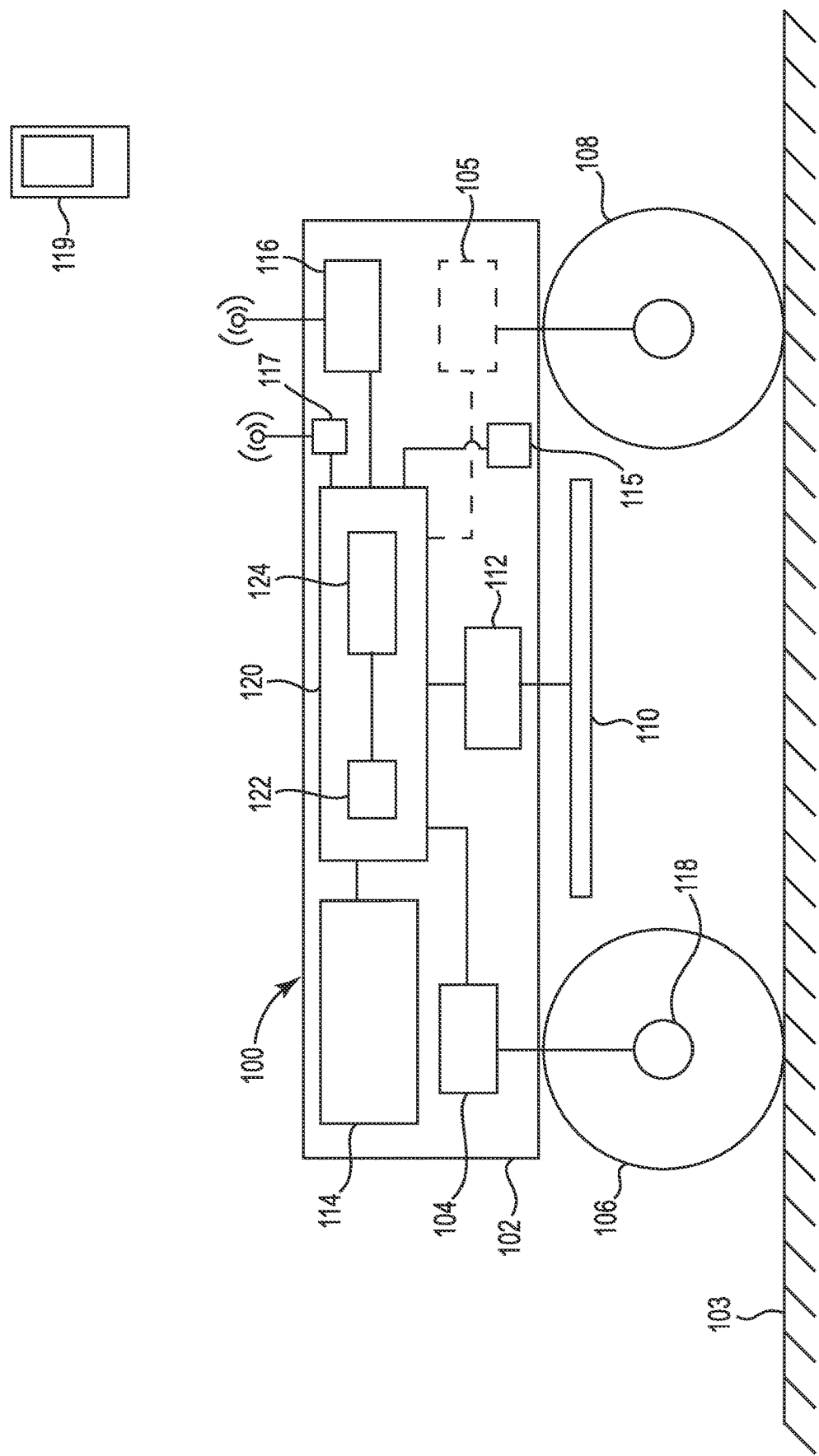
FIG. 1B is a diagrammatic view of an autonomous working vehicle, e.g., robotic lawn mower, in accordance with embodiments of the present disclosure.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 106 and 108 rest upon a generally horizontal ground surface 103 as shown in FIG. 1B). These terms are used only to simplify the description, however, and not to limit the interpretation of any embodiment described.

FIG. 1B illustrates an autonomously operating working vehicle (e.g., a robotic lawn mower 100) of a lawn mowing system, the mower constructed in accordance with exemplary embodiments of the present disclosure (for simplicity of description, the mower 100 is illustrated schematically). As shown in this view, the mower 100 may include a frame or chassis 102 that carries and/or encloses various components of the mower as described below. The mower may further include ground support members, e.g., one or more rear wheels 106 and one or more front wheels 108, that support the chassis 102 upon a ground (grass) surface 103.

One or more of the ground support members may include a drive member. For example. one or both of the rear wheels 106 may be driven (e.g., by one or more electric wheel motors 104) to propel the mower 100 over the ground surface 103. In some embodiments, the front wheels 108 may freely caster relative to the chassis 102 (e.g., about vertical axes). In such a configuration, mower direction may be controlled via differential rotation of the two rear wheels 106 in a manner similar to a conventional zero-turn-radius (ZTR) riding mower. That is to say, a separate wheel motor 104 may be provided for each of a left and right rear wheel 106 so that speed and direction of each rear wheel may be independently controlled. In addition or alternatively, the front wheels 108 could be actively steerable (e.g., using one or more steer motors 105) to assist with control of mower 100 direction, and/or could be driven (i.e., to provide a front-wheel or all-wheel-drive mower).

A grass cutting element (e.g., blade 110) may be carried by the chassis. For example, the cutting element may be coupled to a cutting motor 112 that is itself attached to the chassis 102. When the motors 112 and 104 are energized, the mower 100 may be propelled over the ground surface 103 such that vegetation (e.g., grass) over which the mower passes is cut by the blade 110. While illustrated herein using only a single blade 110/motor 112, mowers incorporating multiple blades, powered by single or multiple motors, are contemplated within the scope of this disclosure. Moreover, while described herein in the context of one or more conventional "blades," other cutting elements including, for example, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The exemplary mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is exemplary only as embodiments wherein blade and wheel power is provided by a single prime mover are also contemplated.

The mower 100 may further include one or more sensors to provide location data. For instance, some embodiments may include a positioning system (e.g., global positioning system (GPS) receiver 116 and/or other position system that may provide similar data) adapted to estimate a position of the mower 100 within a work region and provide such information to a controller 120 (described below). For example, one or more of the wheels 106, 108 (e.g., both rear wheels 106) may include encoders 118 that provide wheel rotation/speed information that may be used to estimate mower position (e.g., based upon an initial start position) within a given work region. Other sensors (e.g., infrared, radio detection and ranging (radar), light detection and ranging (lidar), etc.) now known or later developed may also be incorporated into the mower 100. The mower 100 may further include a sensor 115 adapted to detect a boundary wire when the latter is used to define a boundary of the work region.

The mower 100 may also include a controller 120 adapted to monitor and control various mower functions. The exemplary controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the controller may be operatively connected to the positioning system such that the processor 122 may receive various input data including positional data from the GPS receiver 116 and/or encoders 118, and generate speed and steering angle commands to the drive wheel motor(s) 104 to cause the drive wheels 106 to rotate (at the same or different speeds and in the same or different directions). In other words, the controller 120 may control the steering angle and ground speed (the speed and direction) of the mower 100, as well as operation of the cutting blade 110 (including blade actuation/de-actuation and blade rotation speed).

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120/processor 122 herein may be embodied as software, firmware, hardware, or any combination thereof.

In FIG. 1B, schematic connections are generally shown between the controller 120 and the battery 114, wheel motor(s) 104, blade motor 112, optional boundary wire sensor 115, wireless radio 117 (which may communicate with, for example, a remote computer such as a mobile phone 119), and GPS receiver 116. This interconnection is exemplary only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower.

Exemplary methods of using the mower 100 will now be described, initially with reference to FIG. 2. This figure illustrates a generic rectangular work region 200 (e.g., residential yard) in which the mower 100 may operate. For purposes of describing operation of the exemplary mower, it is assumed that a peripheral boundary 250 of the work region 200 (as well as any exclusion zones (if present) contained within the work region (see, e.g., FIG. 3A)) is known to the mower 100. For instance, the boundary 250 of the work region (and any exclusion zone) may be marked by an energized boundary wire detectable by a sensor (see sensor 115 in FIG. 1B) provided on the mower during a training phase. In addition or alternatively, the boundary 250 may be detectable or known via other techniques without departing from the scope of the disclosure. For instance, the mower 100 may detect machine-visible markings located on the property, or it may map and store boundary information during a training phase of the mower.

Figure 2:
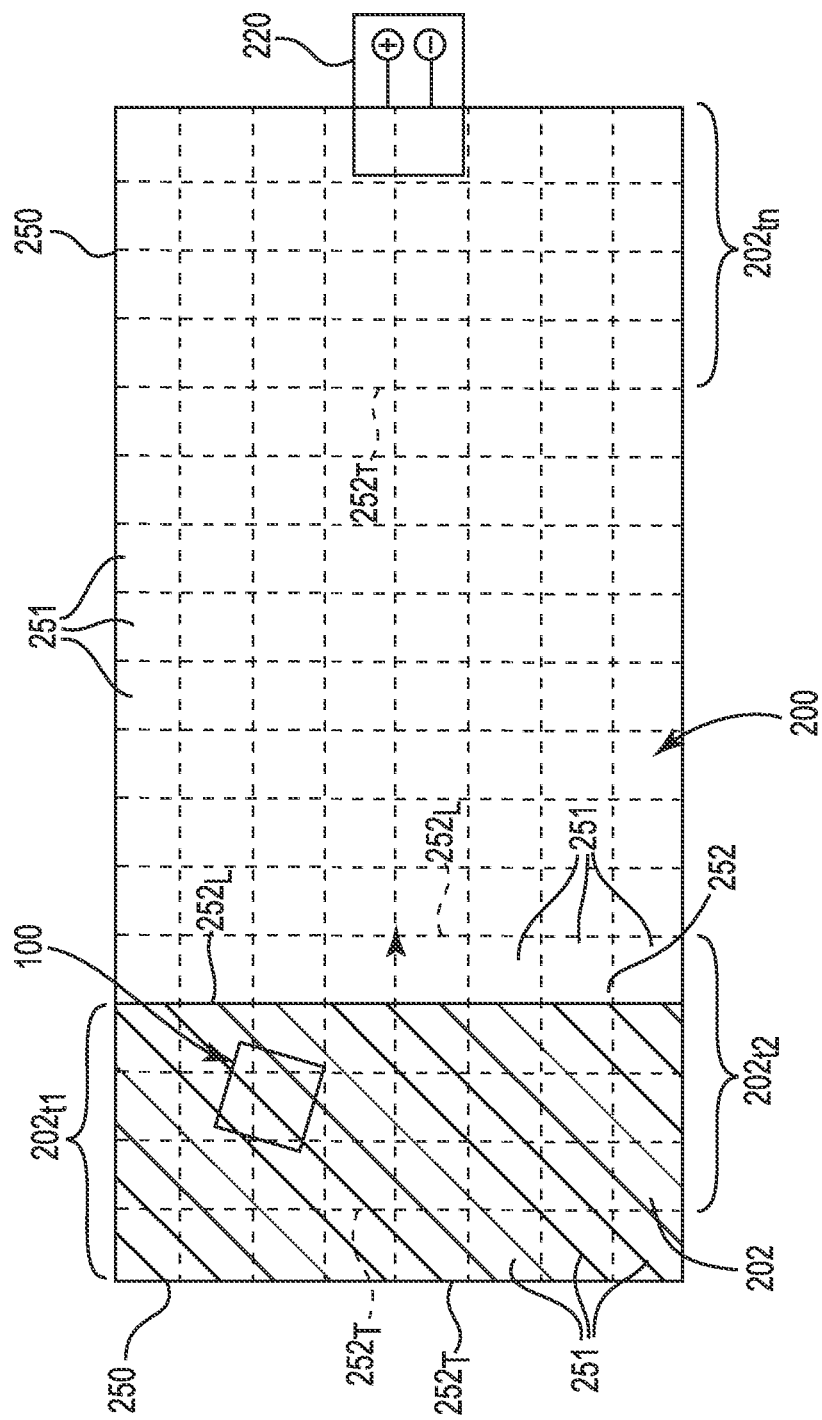
FIG. 2 illustrates an exemplary method of operating the mower within a travelling containment zone of a work region.

In FIG. 2, the boundary 250 of the yard encloses, and defines, the work region 200. As stated above, the exemplary work region 200 is generally rectangular in shape and lacks any exclusion zones (e.g., flower beds, trees, etc.). However, such a shape is exemplary only as embodiments of the present disclosure may find application to work regions (e.g., yards) of most any size and shape and having any number of exclusion zones (see, e.g., work region 300 shown in FIGS. 3A-3K).

The hatched portion of FIG. 2 illustrates what will be referred to herein as a travelling containment zone 202 (see exemplary zones 202t1 and 202t2). The travelling containment zone 202 represents a dynamically changing (e.g., travelling, expanding, contracting, or otherwise moving) subarea of the work region 200 (i.e., the travelling containment zone lies at least partially within the work region and defines a zone area that is less than an area of the work region). A position of the mower 100 may, at any time during operation, be constrained to being within both the travelling containment zone 202 and the work region as the travelling containment zone travels across the work region for reasons that are further described below. In accordance with embodiments of the present disclosure, at least some portions of the travelling containment zone 202 may be delineated by a virtual boundary electronically defined and recognized with the controller 120, i.e., some (or all) portions of the travelling containment zone 202 may not be delineated by any physical demarcation or sensor-detected border. It is further noted that, while illustrated as rectangular, the travelling containment zone 202 may vary in shape as the travelling containment zone moves across the work region.

Unlike the generally fixed work region 200 though, the travelling containment zone 202 may be designed to move or travel across the work region 200 (while the mower autonomously operates within the travelling containment zone) so that all of the working surface (grass surface) of the work region 200 is eventually enveloped within the travelling containment zone. For example, when mower operation is initiated, the controller 120 (see FIG. 1B) may (e.g., based on control algorithms, the known shape of the work region, and previous cutting history, etc.) define or otherwise identify an initial travelling containment zone 202t1 as shown in FIG. 2. Once again, to identify the travelling containment zone 202, the controller 120 may utilize not only the physical boundary 250 of the work region 200 (e.g., that boundary defined by a boundary wire), but also one or more virtual boundaries 252 (e.g., one or more boundaries ultimately extending between physical boundaries of the work area) created by the controller 120. In some embodiments, the travelling containment zone 202 will, although moving, remain a singular enclosed region (e.g., 202t1, 202t2) during the entire mowing operation.

The travelling containment zone 202 is able to provide generally even coverage of the entire work region 200. However, such "even" coverage may not always be optimal. For instance, it is not uncommon for the grass growth rate of some areas of the work region 200 to be different than others. As a result, the controller 120 may maintain histori- cal information regarding the cutting load on the mower at most any given position within the work region 300. "Cutting load," as used herein, refers to the work required by the mower to cut grass. The cutting load may thus be a function of both: power drawn by/supplied to the cutting motor 112 (see FIG. 1B); and the propulsion or ground speed of the mower (which is proportional to power drawn by/supplied to the wheel motor(s) 104). Accordingly, if the controller 120 detects that the cutting load is higher than a predetermined limit, it may slow the speed at which the travelling containment zone 202 moves to ensure that the mower 100 has adequate opportunity to cut the grass within the travelling containment zone 202. Conversely, the controller 120 may increase the rate of movement of the travelling containment zone 202 when cutting load is lower than a predetermined limit. In addition to, or instead of, changing the speed of travelling containment zone 202 movement, the travel speed of the mower 100 could also be increased or decreased. That is, the controller may maintain a speed of the mower 100 while autonomously operating the mower within the travelling containment zone (which may move at a constant or variable rate of speed), or alternatively vary a speed of the mower while operating the mower within the travelling containment zone.

In some embodiments, the mower 100 may move autonomously and in a random manner within the travelling containment zone 202 during operation. Because the travelling containment zone 202 is, by definition, a geographic subset of the work region 200, the travelling containment zone (at any given time) is likely less complex (e.g., has fewer (or no) narrow passages or "bottlenecks" that may cause the mower to get hung-up) and more geographically uniform (e.g., have consistent turf quality) than the work region as a whole. Moreover, the travelling containment zone is also likely to have fewer obstacles than a larger area (i.e., fewer obstacles than contained within the entire work region 200). As a result, the mower 100 is more likely (during random movement) to evenly cover all areas of the travelling containment zone 202 (and thus eventually evenly cover the entire work region 200) than if the randomly-moving mower was only limited to the larger physical boundary of the work region 200.

To ensure the entire work region 200 is covered (cut) by the mower 100, the travelling containment zone 202 may move or travel across the work region, e.g., from left to right in FIG. 2, as the mowing operation progresses. Moving of the travelling containment zone may occur at either a constant rate or a variable rate. As the travelling containment zone 202 moves within the work region 200 depicted in FIG. 2, area is both added to the zone 202 (e.g., by advancement of the virtual leading edge 252L of the virtual boundary 252) and subtracted from the zone 202 (by advancement of the trailing edge 252T of the virtual boundary 252). For example, at some time after mower operation begins, the travelling containment zone 202 will have moved from the initial travelling containment zone (depicted as travelling containment zone 202t1 in FIG. 2) to a new position (depicted as travelling containment zone 202t2). In the illustrated embodiment, the area of 202t1 and 202t2 may remain constant (i.e., the controller may maintain a zone area of the travelling containment zone constant as the travelling containment zone moves across the work region). However, in other embodiments, the area of the travelling containment zone 202 may change (i.e., the controller may vary the zone area of the travelling containment zone as the travelling containment zone moves across the work region). Note that the suffixes "t1, t2, etc." in relation to the containment zone 202 are used only to indicate a different point in time of mower operation. That is to say, the travelling containment zones 202 represented in FIG. 2 illustrate the cutting area at separate instantaneous points in time.

In reality, the area added to and removed from the travelling containment zone 202 via advancement of the leading and trailing edges 252L, 252T may, at least in some embodiments, be set at a rate (constant or variable) selected to ensure adequate cutting of all portions of the travelling containment zone. While dynamic movement of the travelling containment zone 202 may allow efficient coverage of the entire work region 200, it is contemplated that the controller 120 may, occasionally, slow or stop movement of the travelling containment zone for a given period of time. For example, it may be advantageous to maintain an initial position of the travelling containment zone 202t1 for a period of time before the travelling containment zone travels across the work region to ensure that the mower 100 has adequate opportunity to cover the portions of the lawn adjacent the work region boundary (the left-most boundary 250 in FIG. 2). Whether to maintain the position of the travelling containment zone 200 fixed, and how long it remains fixed, may be determined by the controller 120 based upon, e.g., the size of the travelling containment zone, the size and speed of the mower 100, cutting load, and statistical and/or historical coverage information for the mower 100 that may be retained in the memory 124 (see FIG. 1B).

In other embodiments, the initial travelling containment zone 202t1 may, instead of being held stationary, actually start with its trailing edge 252T outside (e.g., to the left in FIG. 2) of the physical boundary 250 of the property (i.e., the travelling containment zone may extend beyond the work region). Although the trailing edge 252T is located beyond the boundary 250, the mower 100 may still be restricted from travelling beyond the work region 200, i.e., the mower may remain within the work region at all times during mowing. As a result, as the travelling containment zone 202 travels during mower operation, the leftmost boundary of the property (e.g., along a boundary 250) will remain in the travelling containment zone for some period of time, i.e., until the trailing edge 252T of the containment zone 202 moves through (to the right of) the yard boundary 250. To practically implement this functionality, the controller 120 could set the initial travelling containment zone equal to a small area, then move the leading edge 252L until the area of the travelling containment zone is equal or "filled" to the desired area, at which point the trailing edge 252T is introduced and starts advancing in relation to the leading edge 252L to ensure the desired area remains constant. This process is illustrated in more detail below (see, e.g., FIGS. 6A-6G).

As mower 100 operation continues, the travelling containment zone 202 may reach the last portions of the work region as shown by work region 202tn in FIG. 2. Again, the controller 120 may maintain the position of the travelling containment zone 202tn for a fixed period of time to ensure portions (the right-most boundary 250) of this containment zone are adequately covered, or it may continue to move the containment zone to the right, effectively shrinking or "emptying" the area of the travelling containment zone as the trailing edge 252T of the travelling containment zone approaches the right-most boundary 250 of the work region 200. Of course, the controller 120 may prevent the travelling containment zone from becoming so small that mower operation is compromised, e.g., the travelling containment zone may avoid contracting beyond a minimum size that would interfere with the mower's ability to move.

By controlling the mower 100 as described above, the mower is, at any given time, limited to operating within a subarea (i.e., a travelling containment zone 202) of the overall work region 200. Given the mower's random travel pattern, it is thus more likely that the mower will cover the entire work region evenly (e.g., avoid leaving uncut sections of lawn) than a mower that is not so restricted. Further, by containing the mower 100 to a smaller travelling containment zone, it is more likely that isolated areas of the lawn (e.g., narrow turf passages between exclusion zones; described with reference to FIGS. 3A-3K below) will be adequately covered, while also minimizing the chance that the mower may get hung-up or trapped for an extended period within such isolated areas.

The actual movement of the travelling containment zone 202 may occur in increments defined by the controller 120. For example, once the work region 200 is mapped by the mower (e.g., during a teaching phase), the controller 120 may overlay a virtual grid on the work region (see, e.g., exemplary grid cells or elements 251 in FIG. 2) as further described below. The grid element size may be small, effectively allowing the travelling containment zone 202 to be defined with high resolution boundaries (at the expense of increased computational loading of the controller 120). Alternatively, if the grid element size is large, the travelling containment zone 202 may move in relatively larger, discrete steps resulting in the travelling containment zone 202 having lower resolution (e.g., "courser") boundaries. In practice, the grid element size is selected to be at least as small as the physical footprint of the mower 100, thereby ensuring that all areas of the work region 200 in which the mower can fit will eventually be covered by the travelling containment zone. To adequately provide coverage along various (e.g., curved) boundaries (see boundary 350 in FIG. 3A) of the work region and exclusion zones (see zones 354 and 355 described below), however, the grid cell size may be set even smaller than the mower footprint. Moreover, while shown as 4-sided elements, other grid cells may be of any polygonal shape (e.g., any shape having three or more sides (e.g., triangular, pentagonal, hexagonal, octagonal, etc.-shaped elements)) without departing from the scope of this disclosure.

The speed at which the travelling containment zone moves, however, may be independent of, and unaffected by, grid size. Rather, at least in some embodiments, movement of the travelling containment zone may be defined by the following equation:

$$\Delta A = B * t \quad \text{(Equation 1)}$$

wherein:

$\Delta A$=area added to, and subtracted from, the travelling containment zone, e.g., meter ($m^2$);

B=rate at which area is covered by the mower in unit-area per unit-time, e.g., $m^2$/second; and t=time interval, e.g., seconds (sec).

Accordingly, the area added to and removed from the travelling containment zone may be independent of actual containment zone size. Rather, the area (e.g., grid cells) added/removed (AA) is dependent on parameter B. The nominal or initial value of B may be directly dependent upon the average speed and cutting width of the mower 100. For instance, a given robotic mower 100 may cover ground area at some unit-area-per-time rate referred to herein as Bo. During normal operation, the controller 120 may set B=Bo. However, when the controller 120 determines that more or less cutting is desired, the parameter B may be adjusted. For example, B may be increased or decreased by an incremental value AB (i.e., B=Bo+AB). Finally, the time interval t may be dependent upon both AA and B.

As an example, AA may be set equal to one (or a multiple thereof) grid cell 251 as shown in FIG. 2 (e.g., AA may be equal to 8 grid cells 251 such that 8 cells are simultaneously added to and subtracted from the travelling containment zone 202). The parameter t is thus the time interval at which grid cells 251 are added and removed from the travelling containment zone (it may thus be constructive to view AA and B as dependent variables and t as independent in Equation 1 above).

In addition to potentially improving coverage efficiency, a dynamically travelling containment zone 202 may also allow the controller 120 to better predict time-to-completion of the mowing operation. That is, by knowing the rate of movement of the travelling containment zone and the size and shape of the yard (which may be known from initial training of the mower and/or historical mowing information), the controller may be able to accurately estimate the time at which the mower will complete mowing of the entire property (e.g., estimate the time at which operation of the mower over the entire work region (over the working surface of the work region) will be complete). This estimate may improve over time as the controller 120 learns how to optimize travelling containment zone movement. Such estimated information may be provided to a homeowner or operator via any number of methods. For example, the mower may include a display that provides, among other data, a time-to-completion estimate. In other embodiments, the mower may include a wireless radio (e.g., IEEE 802.11 "Wi-Fi" radio 117 shown in FIG. 1B) that may communicate over a local area or wide area network with a mobile device (e.g., cellular phone 119). In the case of the latter, the mower may provide the time-to-completion estimate via an application running on the mobile device, or via periodic notifications (e.g., text messages) provided to the mobile device.

While FIG. 2 illustrates a basic methodology in accordance with embodiments of the present disclosure, most properties present a more complicated geometry than the rectangular shape shown in FIG. 2. FIGS. 3A-3K illustrate operation of the mower 100 in accordance with embodiments of the present disclosure over such an exemplary property.

Figure 3A:
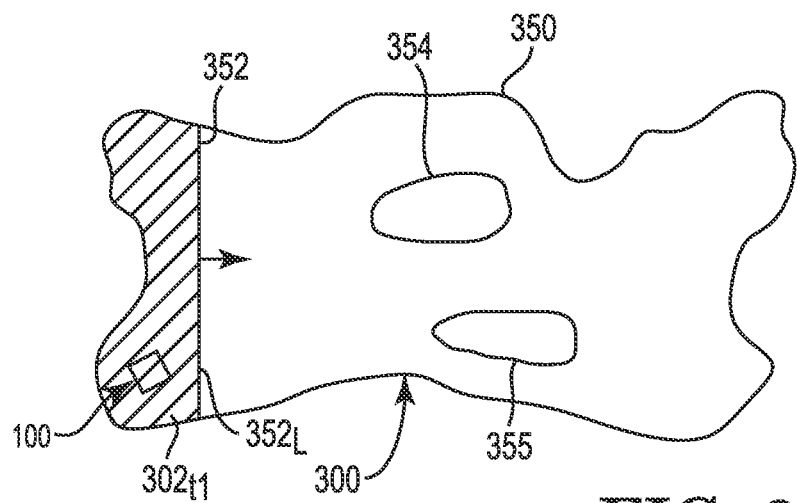

FIG. 3A illustrate a property or work region 300 having an irregular boundary 350 detectable and/or known by the mower 100. The work region 300 may further include exclusion zones 354, 355 that may also be identified by the controller 120 (see FIG. 1B) as boundaries (which boundaries could again be physical (e.g., a wire) or virtual (e.g., an electronic map of the work region 300 known, or otherwise determined, by the controller). Unlike the work region 200 shown in FIG. 2, the work region 300 of FIG. 3A presents a more complicated shape that requires the controller 120 of the mower 100 (see FIG. 1B) to make correspondingly more sophisticated decisions as to how to cover the work region. For purposes of describing FIGS. 3A-3K, the instantaneous or current travelling containment zone 302 (see initial zone 302$t$1) is represented by hatched lines, the portions of the work region that have been covered by the mower are represented by the double-hatched lines, and the uncut portions of the work region are shown unmarked.

As shown in FIG. 3A, the controller 120 may select an initial travelling containment zone 302$t$1 (various containment zones illustrated in FIGS. 3A-3K may be referred to generically as "302") and control the mower's drive wheels until the mower 100 is located at some position within the zone 302$t$1. That is to say, if the mower 100 is not within the travelling containment zone selected by the controller, the mower may be autonomously transported (under control of the controller) from a location beyond the travelling containment zone to a location within the desired containment zone before autonomous mowing begins. For example, the controller 120 may chart a path from its current position to a position somewhere within the travelling containment zone, such path being within the work region 300 and outside of any exclusion zones (e.g., zones 354, 355). Once the path is identified, the controller 120 may control the drive wheels 106 (see FIG. 1B) to transport the mower to the desired position.

The initial travelling containment zone may be selected based on any number of factors including, for example, proximity of the mower 100 to the zone 302$t$1 at the time mower operation begins, and how long it has been since the zone 302$t$1 was last mowed. In some embodiments, the controller 120 may utilize a wavefront grid (further described below), wherein the controller calculates a linear distance from each grid cell to a base position (which may be the location of the mower's base station (see, e.g., 220 in FIG. 2)). Such distances may be calculated based on a path that obeys all boundaries (work region and exclusion zones). The initial travelling containment zone may then be determined to be a zone containing cells farthest from the base position, i.e., the location identified by the greatest value in the wavefront grid.

Figure 3B:
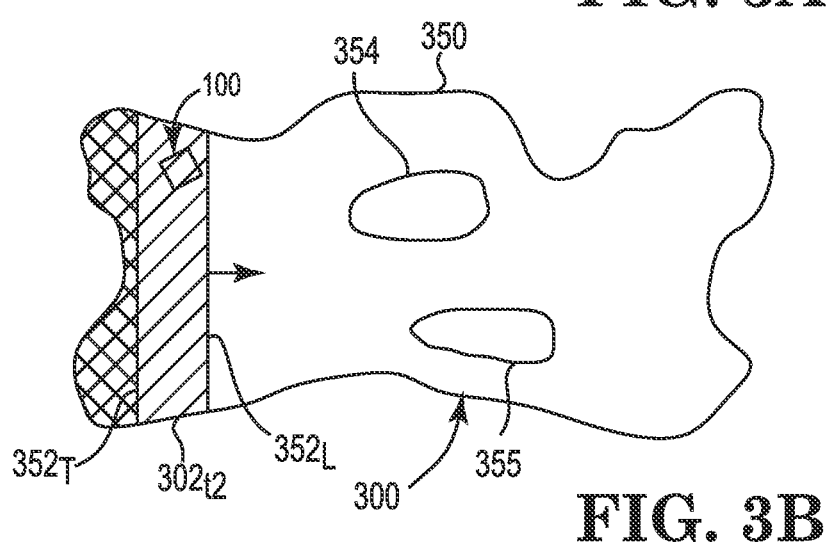

Once positioned within the travelling containment zone 302$t$1, the mower 100 may activate its cutting motor 112 (see FIG. 1B) and begin cutting grass as the mower moves randomly within the confines of the travelling containment zone 302$t$1. As described above, the travelling containment zones 302$t$1 may be fixed for some period of time to ensure the physical boundary of the work region (the left-most edge of the work region boundary 350 in FIG. 3A) is adequately covered. Alternatively, the travelling containment zone could grow or "fill" outwardly (e.g., toward the right) from an initial location at or near the physical boundary 350 of the work region until the containment zone reaches the desired size, at which time a trailing edge of the containment zone would also advance. In either scenario, virtual boundary 352 (e.g., leading edge 352L thereof) may begin to travel (e.g., to the right in FIG. 3A) as time progresses. As shown in FIG. 3B, as the leading edge 352L advances, a trailing edge 352T of the virtual boundary 352 may ultimately follow.

In some embodiments, the "leading edge" is thus a set of grid cells that have been iteratively scored by the controller and added to the travelling containment zone (although not all grid cells along the leading edge are populated, thus avoiding expansion of the travelling containment zone into unintended open areas). Scoring may be performed based upon the wavefront grid values described elsewhere herein. In this way, the controller 120 may better identify direction of movement of the travelling containment zone, and ensure adequate coverage of the containment zone boundaries. Of course, other aspects may also be taken into consideration when populating leading edge grid cells (e.g., maintaining shape quality of the travelling containment zone).

In some embodiments, the boundaries of the travelling containment zone 302 may behave somewhat like a virtual, continuous rope that can "morph" to accommodate most any boundary shape. As a result, the travelling containment zone 302 may accommodate the irregular shaped left boundary of the work region 300 shown in FIG. 3A, and then, once the trailing edge 352T has moved beyond (e.g., to the right of)

the left-most work region boundary, the trailing edge 352T may assume another (e.g., linear) shape as shown by the travelling containment zone 302*t*2 in FIG. 3B. While shown as transitioning to a linear trailing edge 352T to allow efficient mower operation, such a transition is only exemplary as most any shape of travelling containment zone is possible without departing from the scope of this disclosure. In fact, when scoring algorithms like those described herein are utilized to advance the travelling containment zone, the leading edge (and trailing edges) of the travelling containment zone (as well as other edges of the containment zone) may likely have non-linear shapes as illustrated in, for example, the simulations shown in FIGS. 6A-6G.

Again, while the travelling containment zone 302 is illustrated as a distinct zone at any given time in FIGS. 3A-3K (as well as in FIGS. 6A-6G), such depiction is exemplary as the travelling containment zone may move generally continuously (e.g., via small discrete steps) or periodically (e.g., via larger discrete steps) across the work region 300 during mower operation. Thus, the travelling containment zones illustrated in the figures are intended to illustrate only the size and shape of the travelling containment zones at different arbitrary (but discrete) points in time.

Figure 3C:
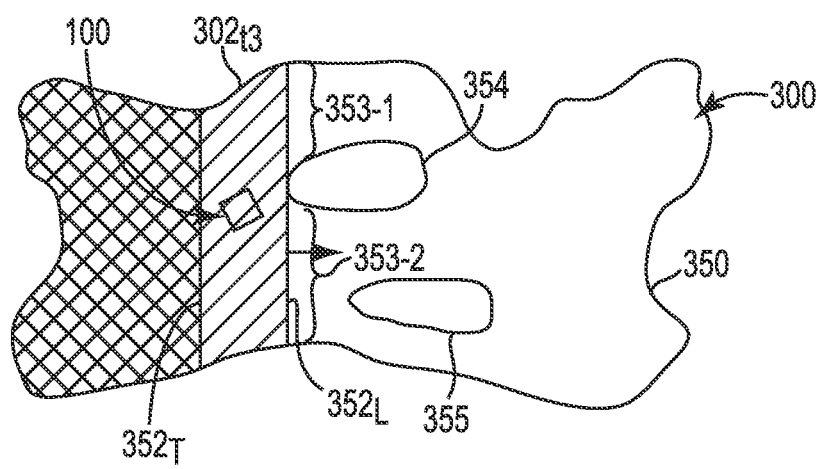
Figure 3D:
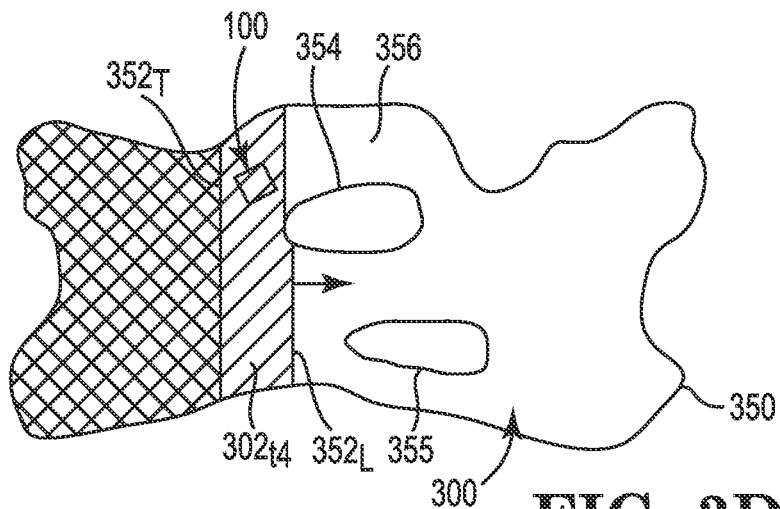

In FIG. 3C, the leading edge 352L of the travelling containment zone 302 (zone 302*t*3) is shown immediately prior to encountering the first exclusion zone 354. Once zone 354 is encountered by the leading edge 352L, the controller 120 decides which segment of the leading edge, i.e., the upper segment 353-1 above the exclusion zone 354, or the lower segment 353-2 below the exclusion zone 354, (in alternate cases, three or more potential leading edges could exist) will become the effective new leading edge 352L. Stated alternatively, the controller 120 may decide at this time whether to move the travelling containment zone to either side of (e.g., along the top or the bottom of) the exclusion zone 354 by selecting either the upper segment 353-1 or the lower segment 353-2 as the "new" leading edge 352L. As shown in FIG. 3D, the controller 120 decides to select segment 353-2 as the new leading edge and thus the travelling containment zone 302 slides or morphs along a lower side of the exclusion zone 354 as illustrated by travelling containment zone 302*t*4. By utilizing algorithms that ensure the boundary of the travelling containment zone remains continuous, the active cutting area may move along the lower boundary of the exclusion zone 354 (and avoid being bisected by the exclusion zone) while the controller 120 logs that an area 356 above the exclusion zone 354 remains uncut.

Figure 3E:
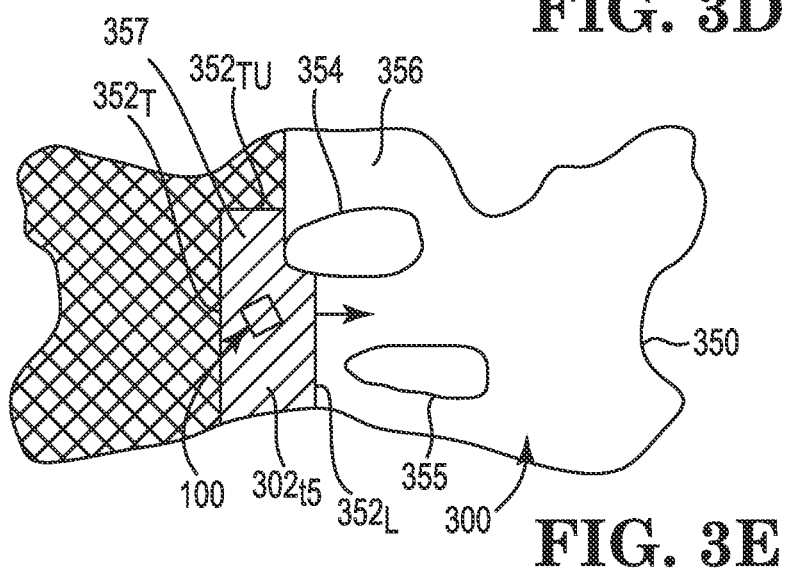

In some embodiments, when the leading edge 352L "splits" (e.g., as shown herein upon encountering the exclusion zone 354), the two potential leading edges (e.g., segments 353-1 and 353-2) may be scored against one another by the controller 120 to assist the controller in selecting one of the potential segments to become the new leading edge (e.g., using the wavefront grid values, most desirable zone shapes, most efficient mowing patterns, etc.). Once the most optimal leading edge segment is selected, the controller 120 may then populate grid cells along that selected segment/leading edge path. This process continues until the leading edge 352L again encounters a boundary. Such boundary encounters include: encountering another boundary that causes the leading edge to again split into two or more segments (see, e.g., encounter with exclusion zone 355 in FIG. 3F); and encountering a dead-end either by hitting a boundary of the work region (see, e.g., encounter with boundary 350 as shown in FIG. 3K); or by hitting the boundary of a previously cut portion of the work region (see, e.g., encounter with previously mowed section as shown in FIG. 3J). In the case of the exclusion zone encounter, the potential leading edges are evaluated as indicated above and operation continues as described. However, when a dead-end is encountered, the trailing edge(s) 352T may move toward the leading edge 352L until the area of the travelling containment zone is effectively zero (in practice, the zone may stay of a sufficient size to avoid constraining movement of the mower). If areas of the work region still remain uncut, the controller 120 may then move the mower 100 to these uncut areas in a manner similar to that described above with regard to moving the mower to the initial travelling containment zone. An example of the latter occurring is shown in FIGS. 3J and 3K and described below.

In practice, the controller 120 may also need to apply algorithms that generally prevent the travelling containment zone from becoming too restrictive for effective mower navigation. For example, as the travelling containment zone progresses (e.g., from the zone 302*t*4 shown in FIG. 3D toward the zone 302*t*5 shown in FIG. 3E), the controller 120 encounters various decision points, such as reaching the exclusion zone 354. Upon reaching the exclusion zone 354, the travelling containment zone 302 may, as described above, slide down along the lower side of the exclusion zone as shown in FIGS. 3D and 3E. However, while the travelling containment zone continues to move, the controller 120 must also apply some constraints on the shape of the zone. For instance, the controller 120 may prevent the trailing edge 352T of FIG. 3E from moving so far to the right that the area indicated by reference numeral 357 becomes too narrow, making mower navigation in the area 357 problematic. Rather, the controller 120 may, as shown in FIG. 3E, limit the minimum width of the area 357 and instead begin drawing an upper trailing edge 352Tu downwardly as the travelling containment zone 302*t*5 expands toward the right. In this way, the travelling containment zone 302 may add area (by moving the leading edge 352L as indicated in FIG. 3E) while subtracting equivalent area (by sliding the upper trailing edge 352Tu downwardly), all while maintaining a position of the left trailing edge 352T to minimize mower navigation issues.

Figure 3F:
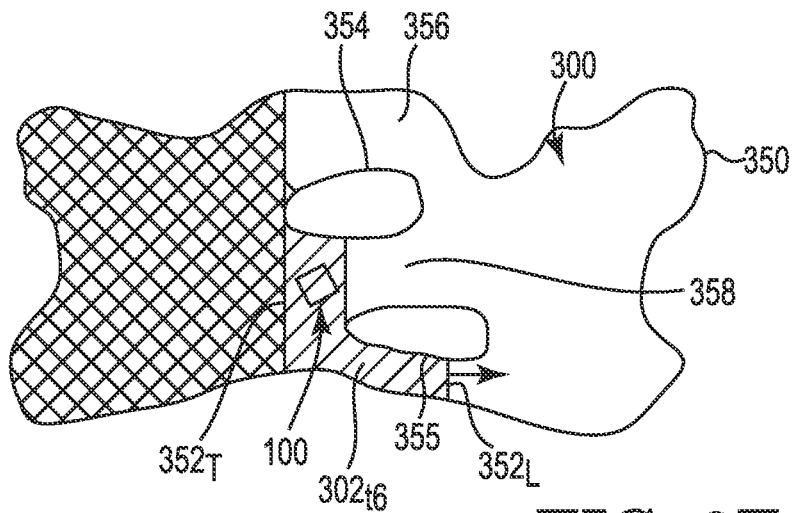
Figure 3G:
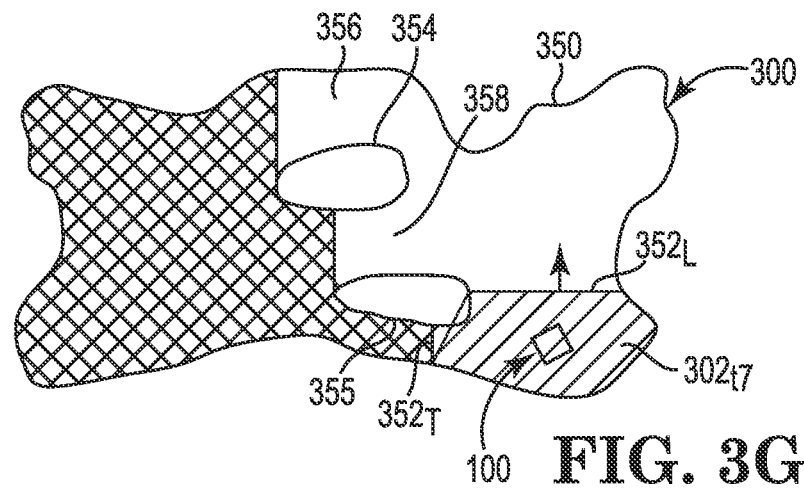
Figure 3H:
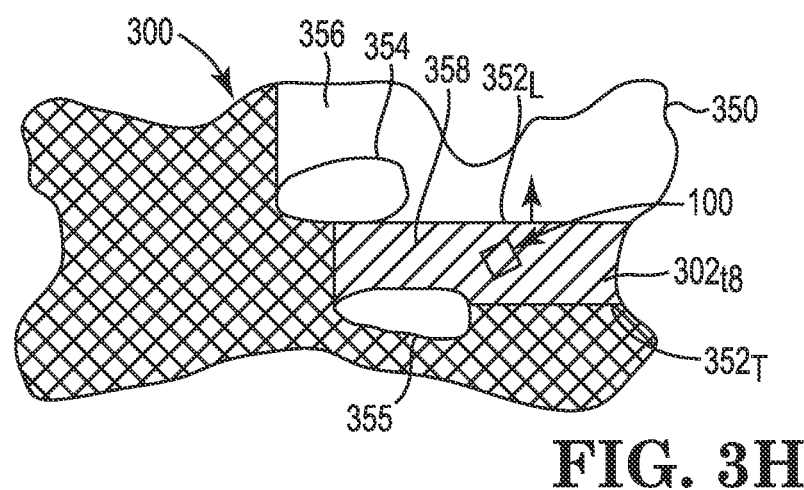

As the travelling containment zone 352 continues to travel across the work region 300, the leading edge 352L of the virtual boundary may reach the second exclusion zone 355 as indicated in FIG. 3F. When this occurs, the controller 120 may again determine—based upon grid cell scoring (or random selection)—to pursue a course (e.g., a segment) above the exclusion zone 355 (e.g., in zone 358 between zones 354 and 355), or a route that first takes the mower 100 below the exclusion zone 355 (e.g., between the zone 355 and the work region boundary), the latter being illustrated by travelling containment zone 302*t*6 in FIG. 3F.

Once the travelling containment zone travels past the exclusion zone 355, the travelling containment zone may expand both toward the right-most boundary 350 (in FIG. 3G) of the work region 300, as well as upwardly as represented by the travelling containment zone 302*t*7 and virtual boundary leading edge 352L. As the travelling containment zone 302 moves above the exclusion zone 355, it may expand into the previously uncut zone 358 (between the two exclusion zones 354, 355) as represented by the travelling containment zone 302*t*8 in FIG. 3H.

Figure 3I:
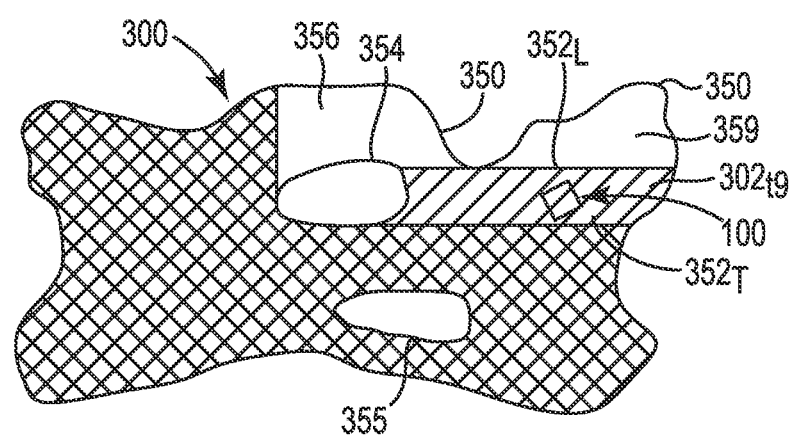
Figure 3J:
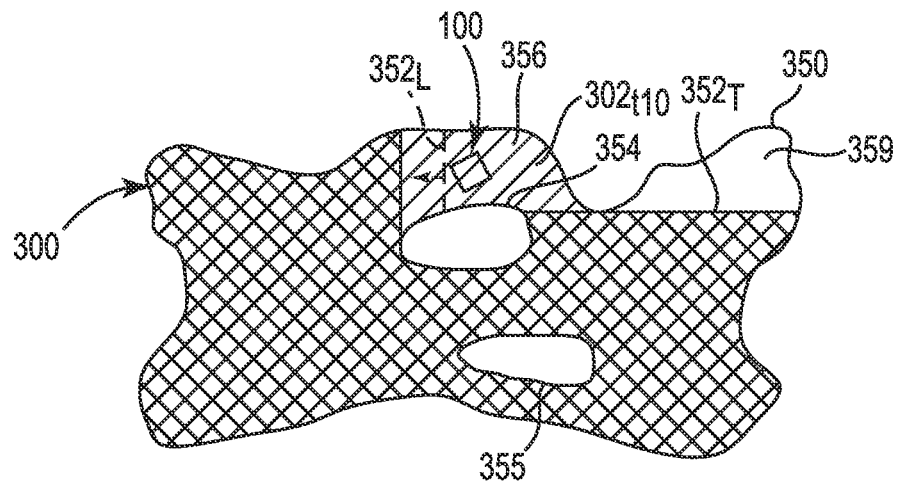
Figure 3K:
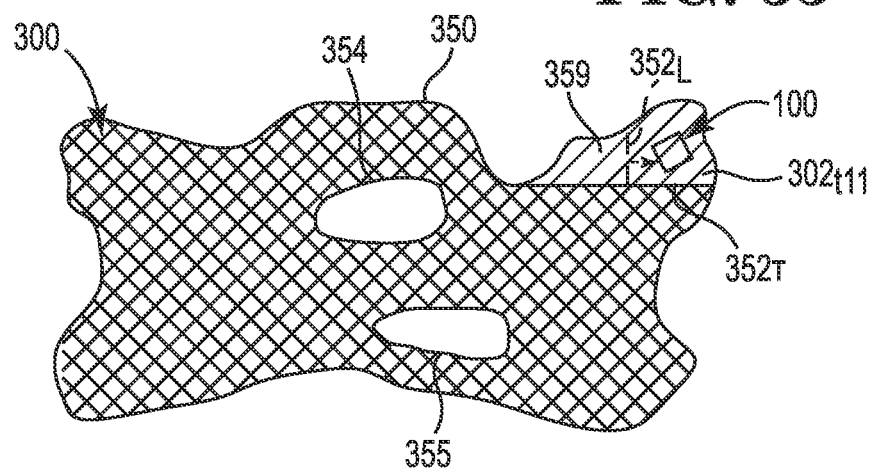

As the travelling containment zone 302 continues to move (e.g., upwardly in FIG. 3I) it again encounters the exclusion zone 354 and may begin to wrap around the right and top side of the exclusion zone to cover the previously uncut area 356 as represented by travelling containment zone 302*t*9 in FIG. 3I. Once the virtual leading edge 352L encounters the boundary 350 as shown in FIG. 3I, the controller 120, knowing that two isolated areas (356 and 359) of the work region 300 remain to be cut, decides whether to move left (e.g., into area 356) or right (e.g., into area 359). In the embodiment illustrated in FIG. 3J, the controller 120 has decided to move the mower 100 left and mow the area 356 as indicated by the travelling containment zone 302$t$10.

Once the mower 100 completes mowing of the area 356, the controller 120 may recognize that area 359 remains uncut and may command the mower to proceed to that area. Once within that area, the mower 100 may re-activate the cutting unit and continue to mow the final uncut area represented by travelling containment zone 302$t$11 as shown in FIG. 3K.

As indicated in FIGS. 3A-3K, the controller 120 may make decisions as to how the travelling containment zone travels to ensure adequate coverage of the work region 300 in an efficient manner. As the mower 100 completes multiple mowing sessions, the controller 120 may also learn which decisions resulted in the most efficient operation. For example, the controller 120 may determine that it would be more efficient to first transition the travelling containment zone above the exclusion zone 354 (rather than below the exclusion zone as shown in FIG. 3D). Once the controller has gathered data for both paths, it may be able to accurately determine which path results in the most efficient operation and pursue that path in the future. Such decisions may be required at various points during the mowing process (e.g., when the exclusion zone 355 (see FIG. 3F) or a dead-end (see FIG. 3J) is encountered). After comparing historical data from previous mowing sessions, the controller 120 may achieve a travelling containment zone travel path that seeks to optimize mower efficiency as well as permits an accurate estimation of job time-to-completion. While the controller 120 may learn and provide the most efficient cutting path for most any work region 300, algorithms may also be provided that permit the mower to pursue alternative paths during different mowing sessions where such alternative paths may be beneficial (e.g., to prevent undesirable effects such as lawn "burn-in" when some boundaries of the travelling containment zone are repeatedly in the same location). Such alternative paths could be provided by storing multiple wavefront grids (i.e., emanating from different base cells on the work area) such that the mower may begin mowing operation at different initial locations and correspondingly make potentially different decisions upon encountering the various boundaries and exclusion zones.

FIGS. 4, 5, and 6A-6H illustrate computer-simulated mowing coverage of another work area 400 in accordance with embodiments of the present disclosure. As with the work area 300, the work area 400 may be circumscribed by a boundary 450 and includes various exclusion zones 454-1, 454-2, and 454-3 (collectively "454") contained therein. Data defining the boundary/exclusion zones may be stored in memory 124, e.g., after a training process, or otherwise known by the controller 120. Values shown on the axes in these figures represent units of length (e.g., meters).

Figure 4:
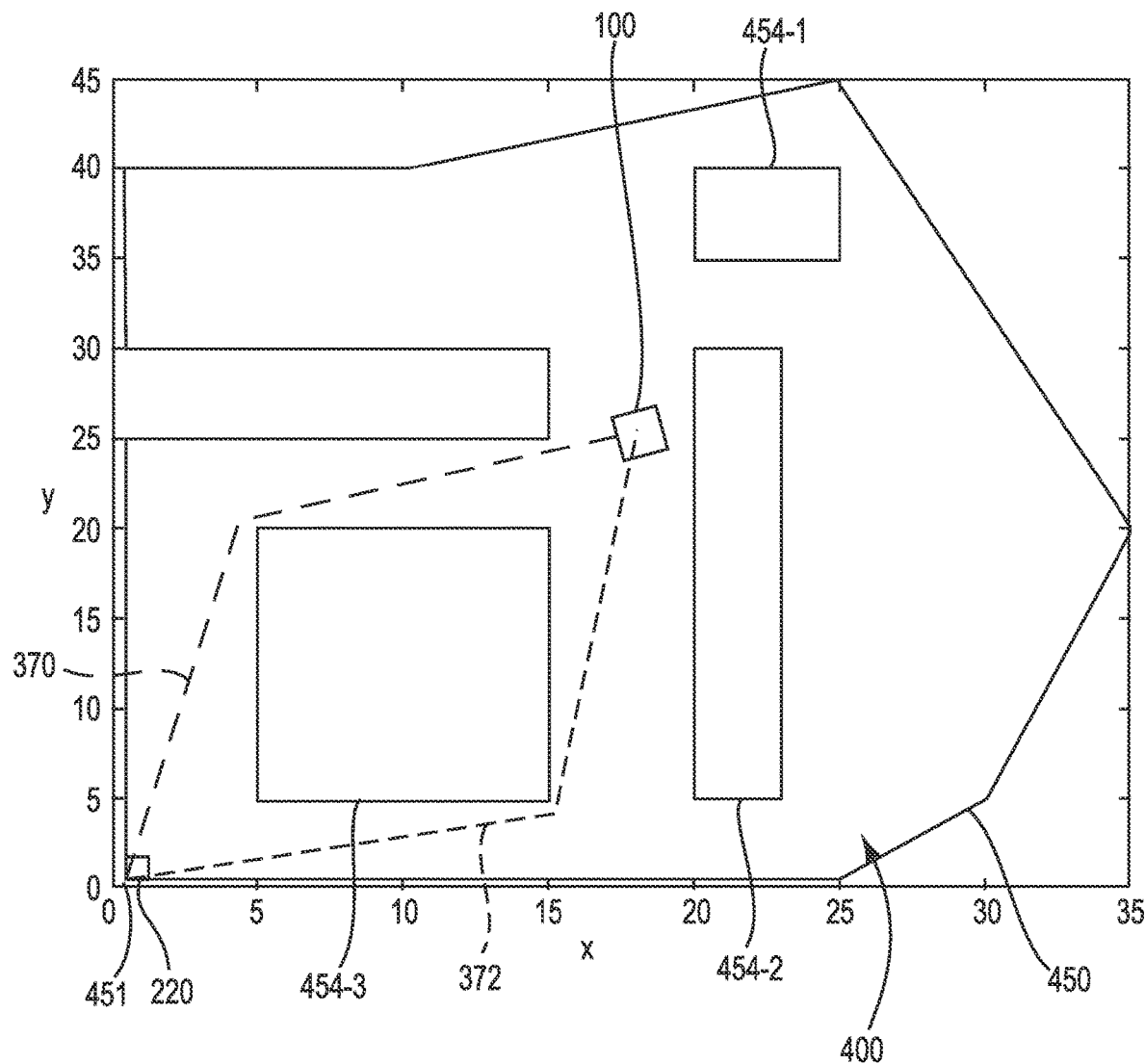
FIG. 4 illustrates a map of yet another exemplary work region defined by a boundary and containing multiple exclusion zones, the work region laid over an x-y grid, the grid defining a plurality of grid cells.

As shown in FIG. 4, an x-y grid may be superimposed over the work area 400 with an initial position (e.g., origin at coordinate 0,0) at work area vertex 451. The initial position may be a location of the system base station 220 used to house and re-charge the mower when not in use, the base station typically being located in or near the work region. While the grid is generally illustrated as two-dimensional in FIG. 4, it is certainly adaptable to work areas having elevational variation without departing from the scope of this disclosure.

Initial wavefront grid values may be calculated (e.g., with the controller 120), propagating from this initial position. For general information regarding wavefront grids, see, e.g., E. Galceran, M. Carreras, *A Survey on Coverage Path Planning for Robotics*, Robotics and Autonomous Systems 61 (2013) 1258-1276.

Figure 5:
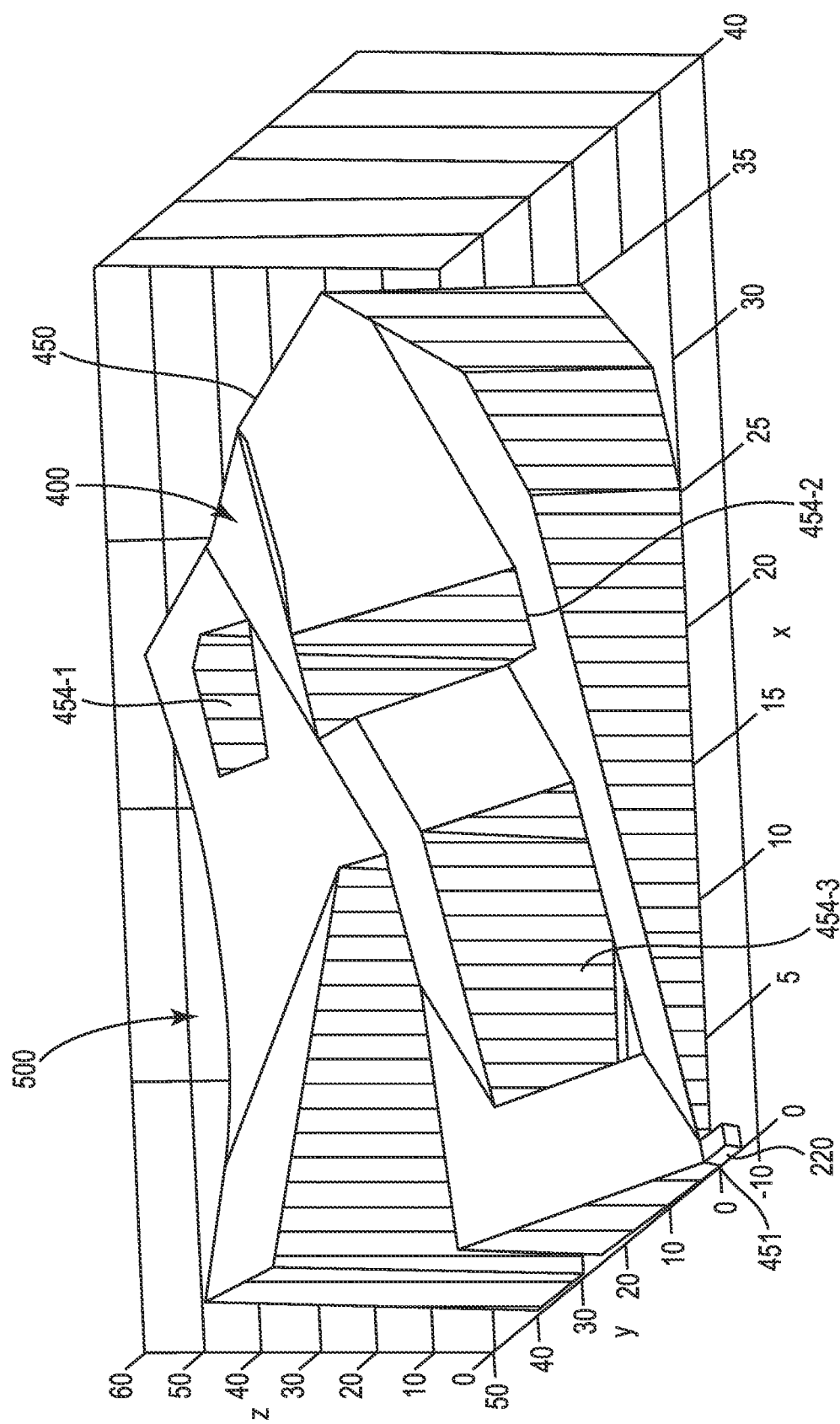
FIG. 5 is a visual depiction of an exemplary wavefront grid of the work region map of FIG. 4.

An exemplary wavefront grid 500 for the work area 400 is visually represented in FIG. 5. In this figure, a distance (measured along a path that avoids all exclusion zones) from the initial cell to any other cell within the work area 400 is represented by the vertical or z-axis. As further shown in this view, the wavefront grid 500 also accounts for both the boundary 450 of the work area 400, as well as the exclusion zones 454. Again, while a single wavefront grid 500 is illustrated herein, mowers and systems in accordance with embodiments of the present disclosure may map and store multiple wavefront grids, e.g., emanating from different initial cells.

With the data from this map, the controller 120 may compute the shortest travel distance from the base cell (i.e., cell from which the wavefront grid propagates, which is located at coordinates 0,0 in the example of FIG. 5) to any other cell on the grid (e.g., within the work area 400), considering all boundaries (including boundaries of the work area and the exclusion zones). Accordingly, the controller 120 may identify efficient mower routes (e.g., to return to base station, to travel to new, uncut portion of the work area, etc.) as needed during operation. For instance, if the mower 100 were to require re-charging when at the location shown in FIG. 4, the controller 120 could determine, based upon the wavefront grid, that route 370 is shorter than route 372 and select the former travel path to return to the base station 220.

Figure 6A:
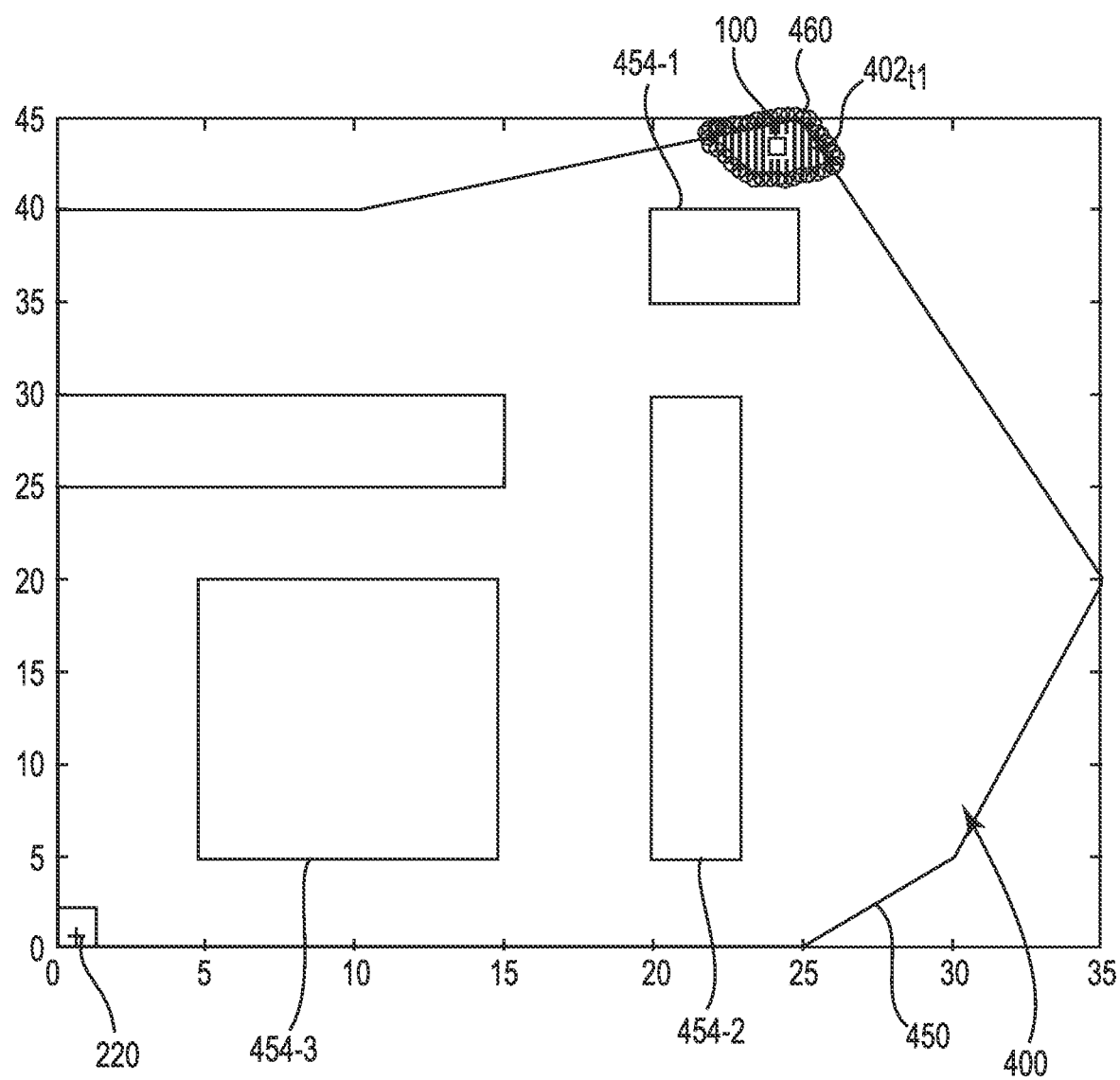

With the wavefront grid values computed and stored in memory 124, the controller 120 may command the mower to first move, e.g., from the initial cell (proximate base station 220) to the cell farthest from this initial position (i.e., the cell having the highest wavefront grid value) and commence mowing. In the exemplary workspace 400, the mower 100 would thus move to, and commence mowing at, the cells nearest vertex 460 of the boundary 450 as shown in FIG. 6A.

Figure 6B:
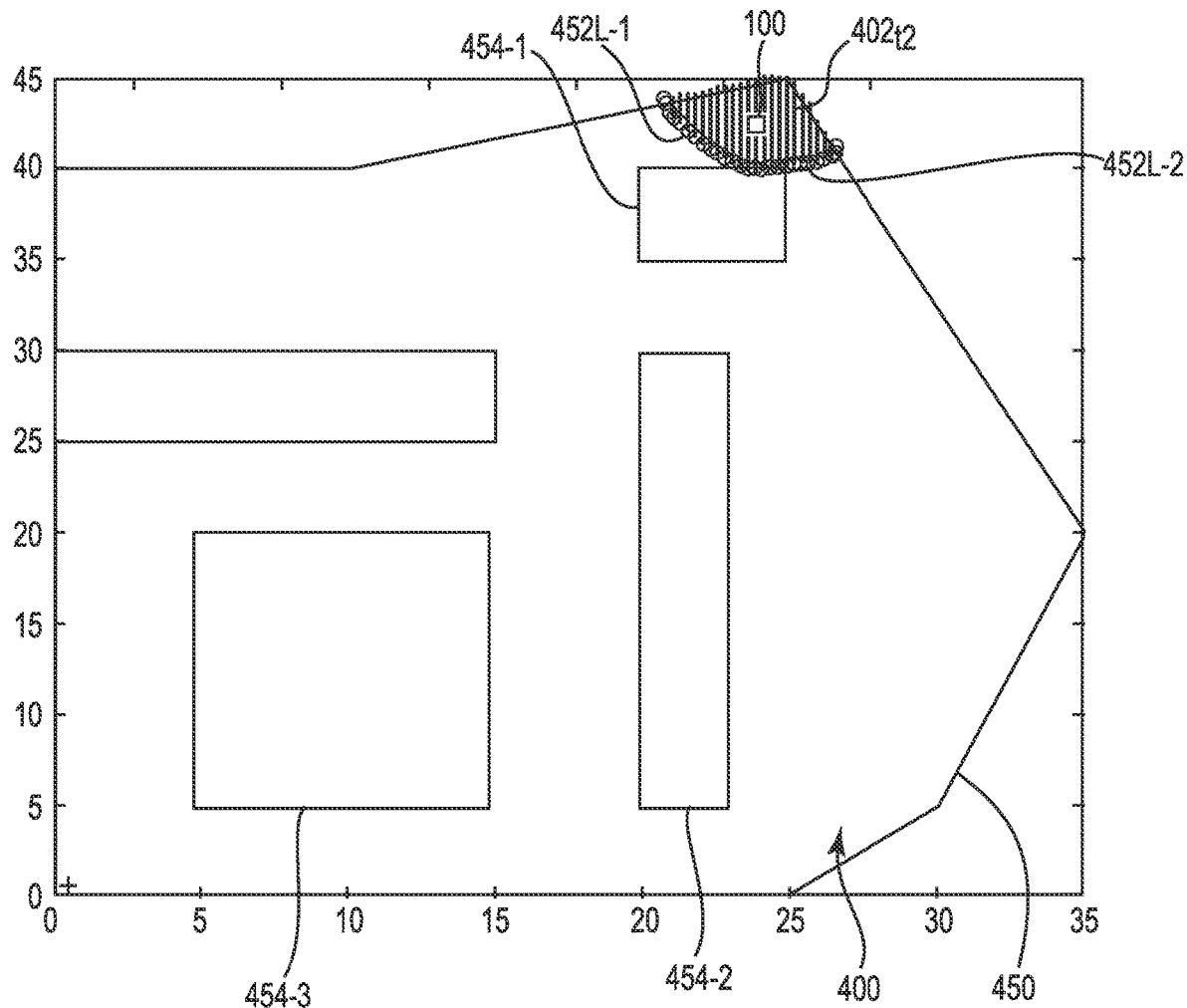

The controller 120 may establish an initial travelling containment zone 402$t$1 (containment zones are darkly hatched in FIGS. 6A-6G, while cut portions are double-hatched and unmowed areas are unhatched) and grow that zone outwardly from vertex 460. In order to determine the expansion directions of the travelling containment zone 402, the controller 120 may perform a scanning function wherein it analyzes and records (e.g., continuously or periodically) data regarding each of the grid cells externally adjacent to a virtual perimeter of the travelling containment zone 402. For example, initially the travelling containment zone 402 may expand in multiple directions (e.g., generally radially) as shown in FIG. 6A. However, as shown in FIG. 6B, the leading edge of the expanding travelling containment zone 402 may eventually contact a side of the exclusion zone 454-1 and split as indicated by the segments 452L-1 and 452L-2 of the zone 402$t$2 (as used herein, the term "segment" is used to identify a virtual boundary that is delimited by a containment boundary (e.g., boundary 450) and/or an exclusion zone (e.g., exclusion zone 454-1)). In this example simulation, the controller 120 may, upon contact of the leading edge with an exclusion zone, detect impending bifurcation of the leading edge into first and second segments 452L-1 and 452L-2. That is to say, once the advancing virtual perimeter of the travelling containment zone 402 contacts the exclusion zone 454-1, the controller 120, in order to avoid bifurcating the travelling containment zone 402/leading edge 452, performs a decision-making function, wherein it decides a direction in which to advance the leading edge of the travelling containment zone. In the illustrated example, the controller may decide to either: expand the travelling containment zone above the exclusion zone 454-1 (pursue mower movement by replacing the leading edge with the first segment 452L-1); or expand the travelling containment zone downwardly along the side of the exclusion zone 454-1 (pursue mower movement by replacing the leading edge with the second segment 452L-2).

To make this decision, the controller 120 may identify grid cells that are adjacent each of these segments but not within the travelling containment zone 402$t$2 (or that were not previously visited by the travelling containment zone). These adjacent grid cells are then scored based upon mean values previously calculated in the wavefront grid (in some embodiments, other parameters of the cells may also be scored). Information concerning each segment score (as well as other information such as identifiers for the boundaries spanned by each segment (e.g., the border 450 may have one boundary ID, and each exclusion zone 454 may have its own unique boundary ID), and geographic location of the segment) may then be passed to a decision-making algorithm executed by the controller 120.

In the example work area 400 shown in the simulation of FIG. 6B, the wavefront grid values are higher along segment 452L-2 (see, e.g., FIG. 5). As a result, the controller 120 may direct the travelling containment zone 402 to move forward with the segment 452L-2 becoming the new leading edge of the travelling containment zone.

Once the decision is made regarding which segment will be pursued, the controller 120 may execute a population function, wherein it adds cells to the travelling containment zone (e.g., immediately forward of the new leading edge), and, optionally, a depopulation function, wherein it removes cells (e.g., by advancing the trailing edge of the travelling containment zone). In this way, the travelling containment zone may move across the work region while the mower operates therein.

The travelling containment zone 402 may continue to travel downwardly (e.g., with leading edge 452L-2 in FIG. 6B), populating cells forward of the leading edge and ultimately depopulating cells along the trailing edge (away from the segment 452L-1 shown in FIG. 6B). This process continues when the leading edge 452L-2 reaches the lower vertex 461 of the exclusion zone 454-1 (see FIG. 6C). At this point, the leading edge of the travelling containment zone 402 can continue to move both downwardly (between the right-hand boundary 450 and the containment zone 454-2), as well as move to the left between the containment zones 454-1 and 454-2.

Figure 6C:
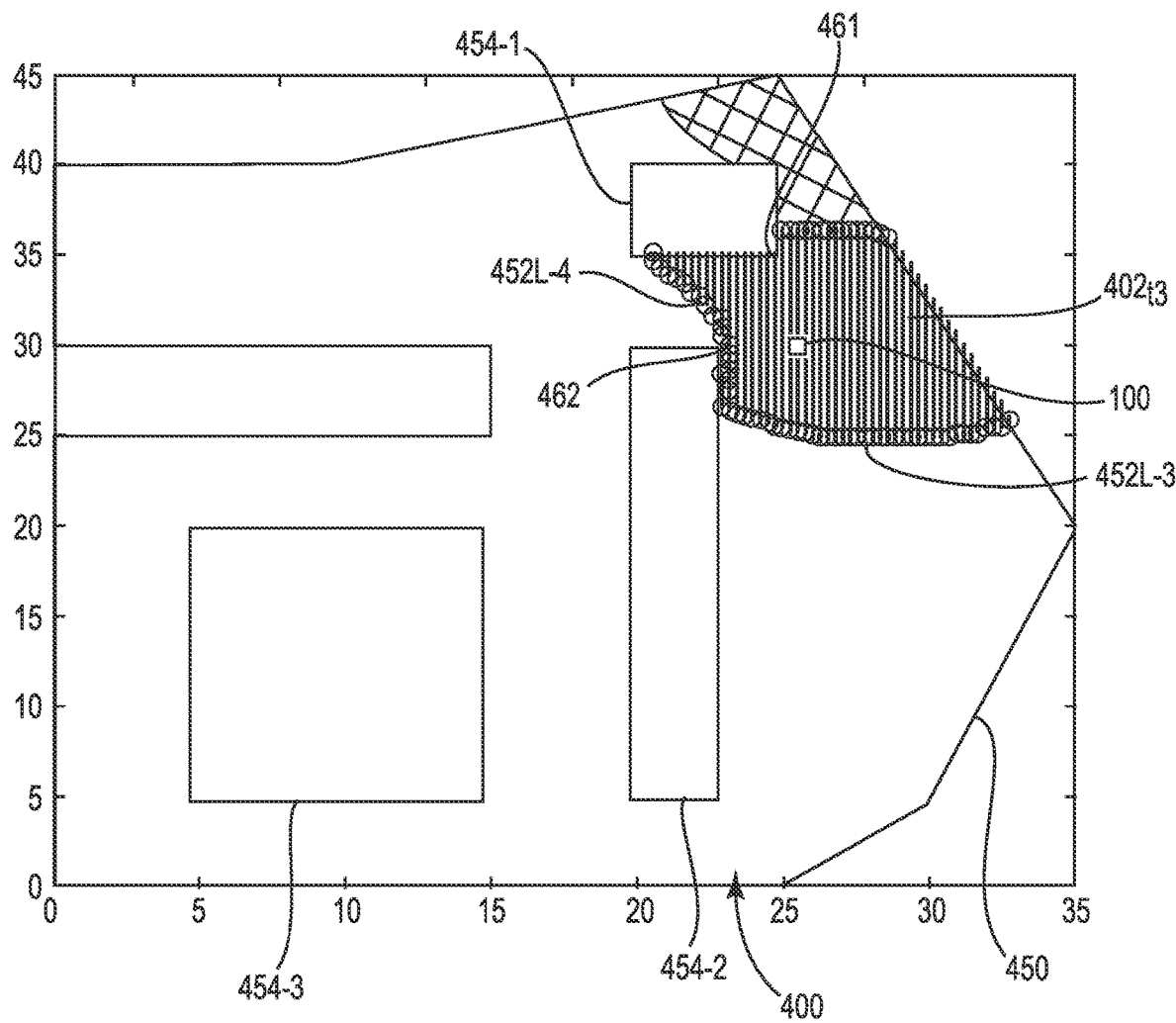

However, once the leading edge of the travelling containment zone contacts the upper right vertex 462 of the exclusion zone 454-2 in FIG. 6C, the leading edge again splits into two segments 452L-3 and 452L-4. To again avoid bifurcation of the travelling containment zone/leading edge, the controller 120 may receive cell scores from the scanning algorithm regarding the grid cells externally adjacent each of these segments based at least in part upon the cell values in the wavefront grid, and provide those scores to the decision-making algorithm. As evident in FIG. 5, the cells along the segment 452L-3 have a higher wavefront grid value than the cells along the segment 452L-4. As a result and as shown in FIG. 6C, the decision-making algorithm thus decides to move the travelling containment zone 402 (402$t$3) downwardly by advancing the segment 452L-3 as the new leading edge. At some point, the segment 452L-4 may then become a trailing edge following the travelling containment zone downwardly, depopulating cells in the process.

This process of scanning and making decisions that prevent bifurcation of the travelling containment zone/leading edge may continue throughout the work area 400. Typically, the decision-making algorithm will pursue population of cells that score higher, (i.e., those having a higher wavefront grid value). However, scoring may also consider other parameters as further described below.

Figure 6D:
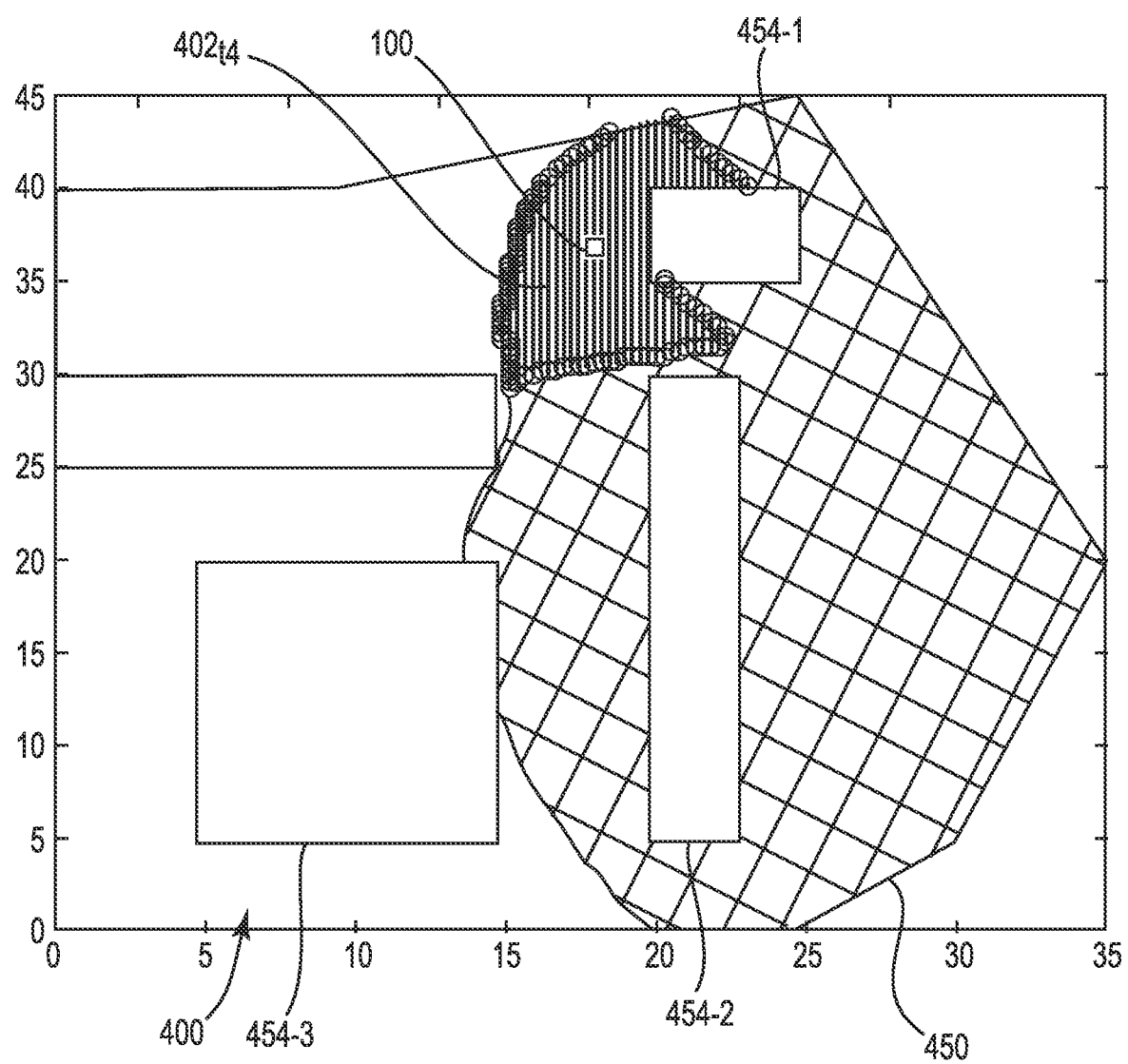

As shown in FIG. 6D, the travelling containment zone 402 (402$t$4) may travel down and beneath the exclusion zone 454-2 and then, based on leading edge scoring, travel up the left side of the exclusion zone 454-2. As the controller 120 tracks those cells already visited, the travelling containment zone may ultimately cover the uncut area between the exclusion zones 454-1 and 454-2 (abutting the segment 452L-4 in FIG. 6C).

Figure 6E:
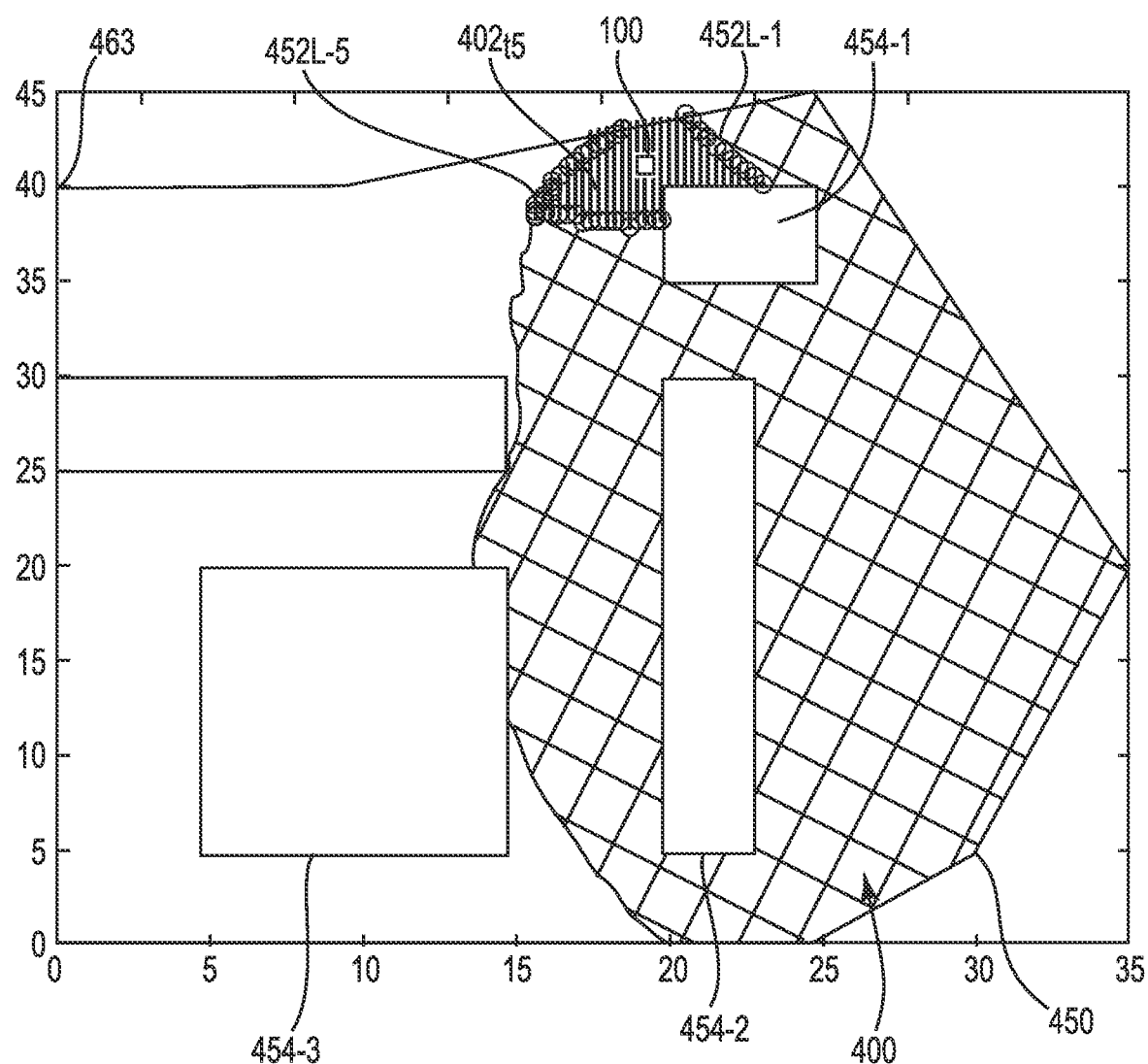
Figure 6F:
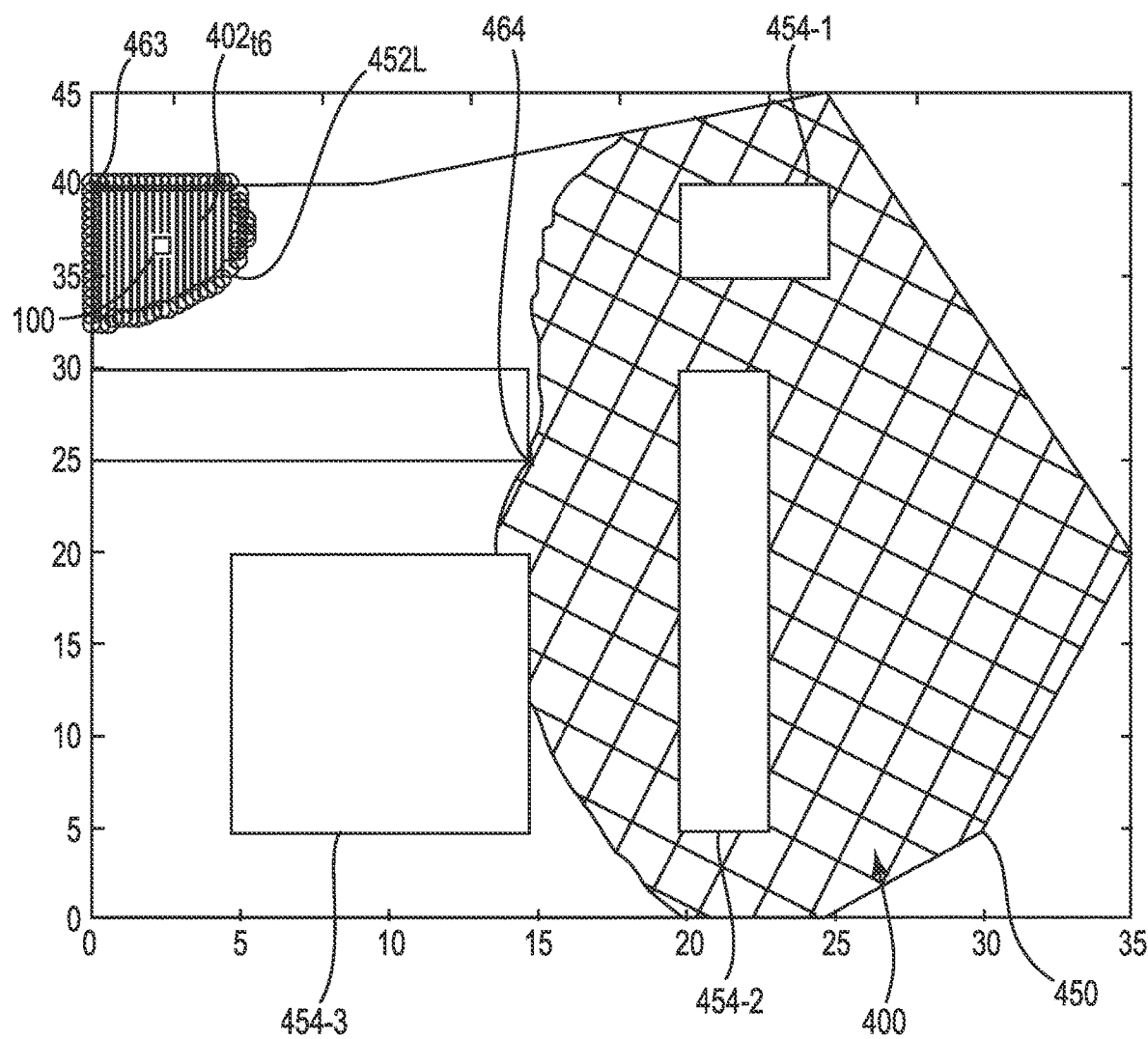
Figure 6G:
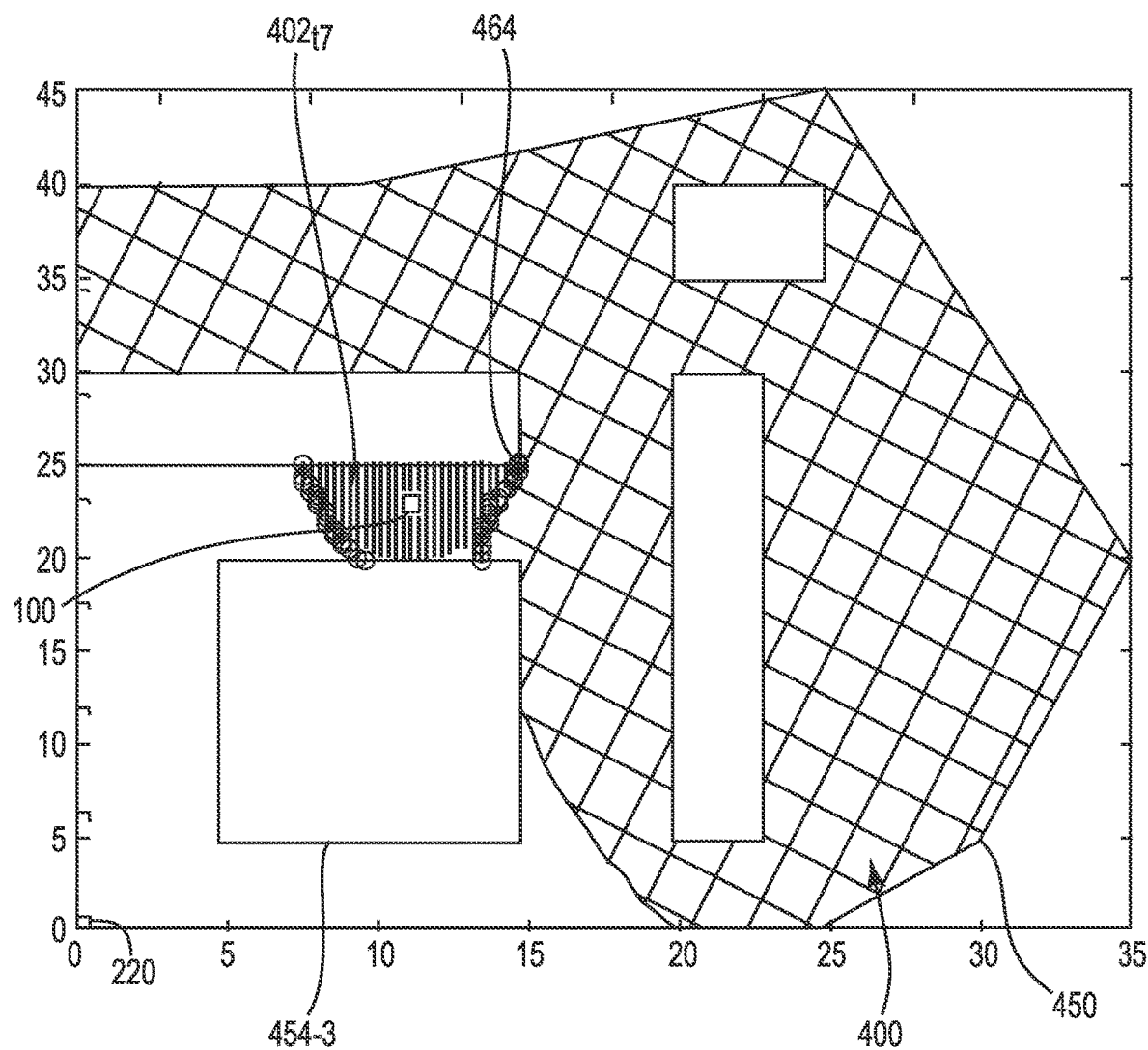

As shown in FIG. 6E, the travelling containment zone 402 (402$t$5) may eventually dead-end (i.e., at the segment 452L-1 also shown in FIG. 6B). When this occurs, the travelling containment zone 402 may collapse to a minimally navigable size to ensure adequate coverage of the dead-end area. Once covered, the mower 100 may disable its cutting blades (e.g., de-energize the motor 112 (FIG. 1B)) and then travel to a portion of the work area 400 that is yet to be cut. This uncut area again may be determined by evaluating the wavefront grid values of the remaining uncut cells of the work area 400 and determining which cells have the highest scores. In the simulation shown in FIGS. 6A-6G (see FIG. 5), the controller 120 may thus command the mower 100 to move to the portion of the work area 400 in and around the cells adjacent the vertex 463 as shown in FIG. 6F. The cutting blades may then again engage, and the temporary cutting zone 402 (402$t$6) may grow/move to cover the portion of the work area in the upper left quadrant of FIG. 6F.

The travelling containment zone 402 (e.g., zone 402$t$6 in FIG. 6F) may then advance until it dead-ends against the previously cut portion of the work zone 400. At this point, the mower 100 may again disable its cutting blades and travel to another portion of the work area 400 that is yet to be cut. Again, determination of the next starting point may be selected based upon the remaining cells having the highest wavefront grid value, e.g., the portion of the work area in and around the cells near vertex 464 in FIG. 6G. The travelling containment zone 402 (402$t$7) may then expand and travel to cover the remaining uncut portions of the work area 400, e.g., those portions above, to the left of, and below the exclusion zone 454-3 in FIG. 6G. Once the entire work area 400 has been covered by the mower 100, the mower may de-energize its blade(s) and return to the base station 220 for re-charging.

The "dead-end" situation illustrated in FIG. 6E is not the result of encountering a physical boundary (i.e., encountering the boundary 450 or an exclusion zone 454), but rather the result of the leading edge segmentation algorithm implemented in the illustrated embodiments. That is, the dead-end encountered in FIG. 6E is really a "virtual" dead-end created by the previously established segment 452L-1 (see FIG. 6B). Examples of hard dead-end scenarios that occur independent of work area segmentation are shown in, for example, encountering the boundary 350 in FIG. 3K, and encountering the right-most boundary 250 in FIG. 2.

While not illustrated, methods and systems in accordance with embodiments of this disclosure may avoid at least some of these virtual dead-ends. For example, in the situation illustrated in FIG. 6E, the controller could alternatively recognize that the previous segment 452L-1 will ultimately result in a dead-end. It could then evaluate other segments of the travelling containment zone (e.g., the left-most edge 452L-5 in FIG. 6E) to determine a travel path that could avoid such a dead-end result. For instance, instead of collapsing into the dead-end in FIG. 6E, the travelling containment zone 402t5 could instead, at or before the time represented in FIG. 6E, begin travelling to the left using the leading edge 452L-5. In this scenario, the static segment 452L-1 would eventually begin travelling to the left as well, forming the trailing edge of the travelling containment zone. The travelling containment zone could then continue to advance toward the left-most boundary 450 in the upper left quadrant of the work area 400, where it would then dead-end against the physical boundary 450.

As evident from the description above regarding FIGS. 6A-6G, travelling containment zone systems and methods in accordance with embodiments of the present disclosure may involve at least four processing functions: scanning (scoring externally adjacent cells); decision-making (deciding where to direct the travelling containment zone); populating cells (adding cells along the leading edge of the travelling containment zone); and depopulating cells (i.e., removing cells along the trailing edge of the travelling containment zone). As used herein, "externally adjacent" refers, at any given time, to cells that are outside of the travelling containment zone, but are located adjacent to a boundary of the containment zone.

Figure 6H:
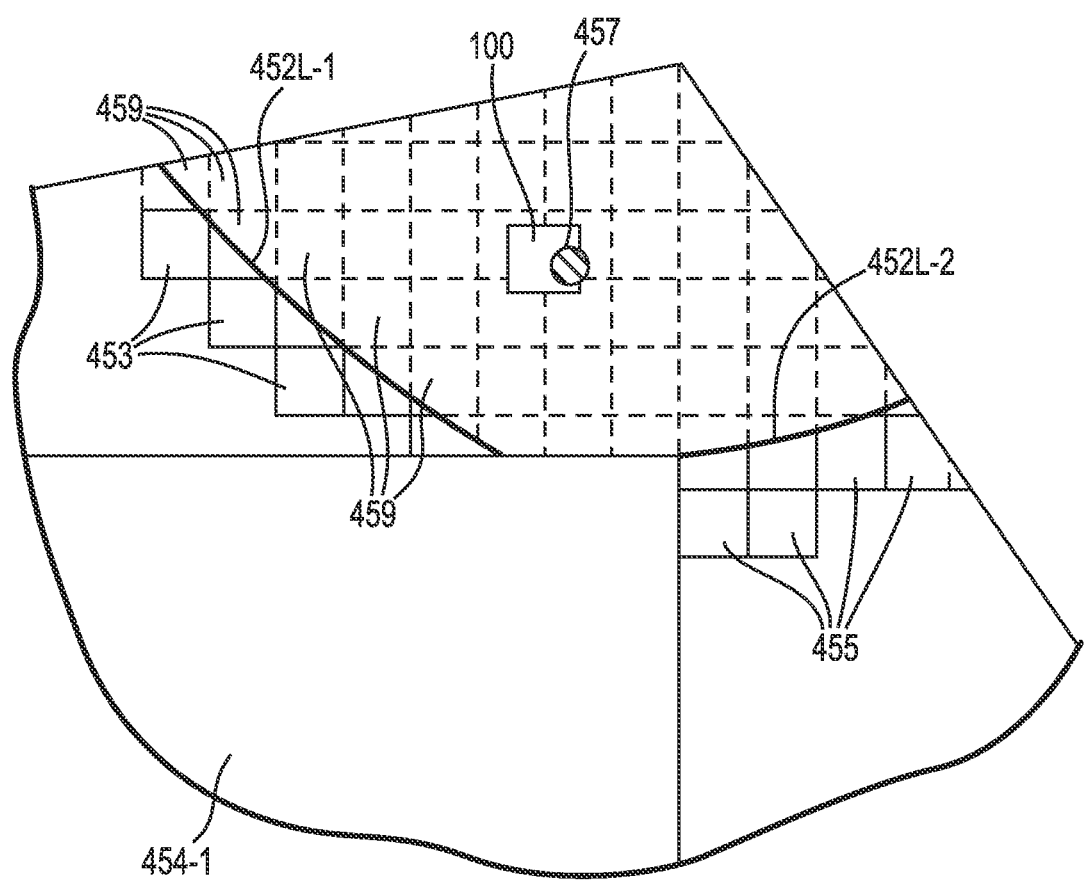

FIG. 6H is an enlarged portion of the zone 402t2 shown in FIG. 6B. The cells illustrated in this view are enlarged for clarity. As stated above, actual grid cell size may be smaller than that illustrated (e.g., to provide a higher resolution grid). The work region itself may bound a first plurality of grid cells (only some of these cells (peripheral or externally adjacent to the edges 452L-1 and 452L-2) are illustrated in this figure), while the travelling containment zone bounds a lesser, second plurality of grid cells (the second plurality being a subset of the first plurality of grid cells).

At the particular point in time represented in FIG. 6H, the first processing function (scanning) may score two or more cells, wherein one of the two or more cells is selected from the cells 453 externally adjacent to the edge 452L-1; and another of the two or more cells is selected from the cells 455 externally adjacent to the edge 452L-2. Such scoring may again be based on parameter(s) including, for example: evaluating or comparing wavefront grid values of each of these two or more grid cells; and comparing a distance from each cell of these two or more grid cells to a centroid 457 of the travelling containment zone. Based upon this analysis, the controller may execute the second (decision-making) function and select one of these edges to form the new leading edge of the travelling containment zone. The controller may then populate cells (e.g., add cells 455 (e.g., from the first plurality of grid cells) to the travelling containment zone) along the new leading edge 452L-2 (third function) and depopulate cells (e.g., remove cells 459 from the travelling containment zone) along what will now be the trailing edge of the travelling containment zone (fourth function).

Figure 7:
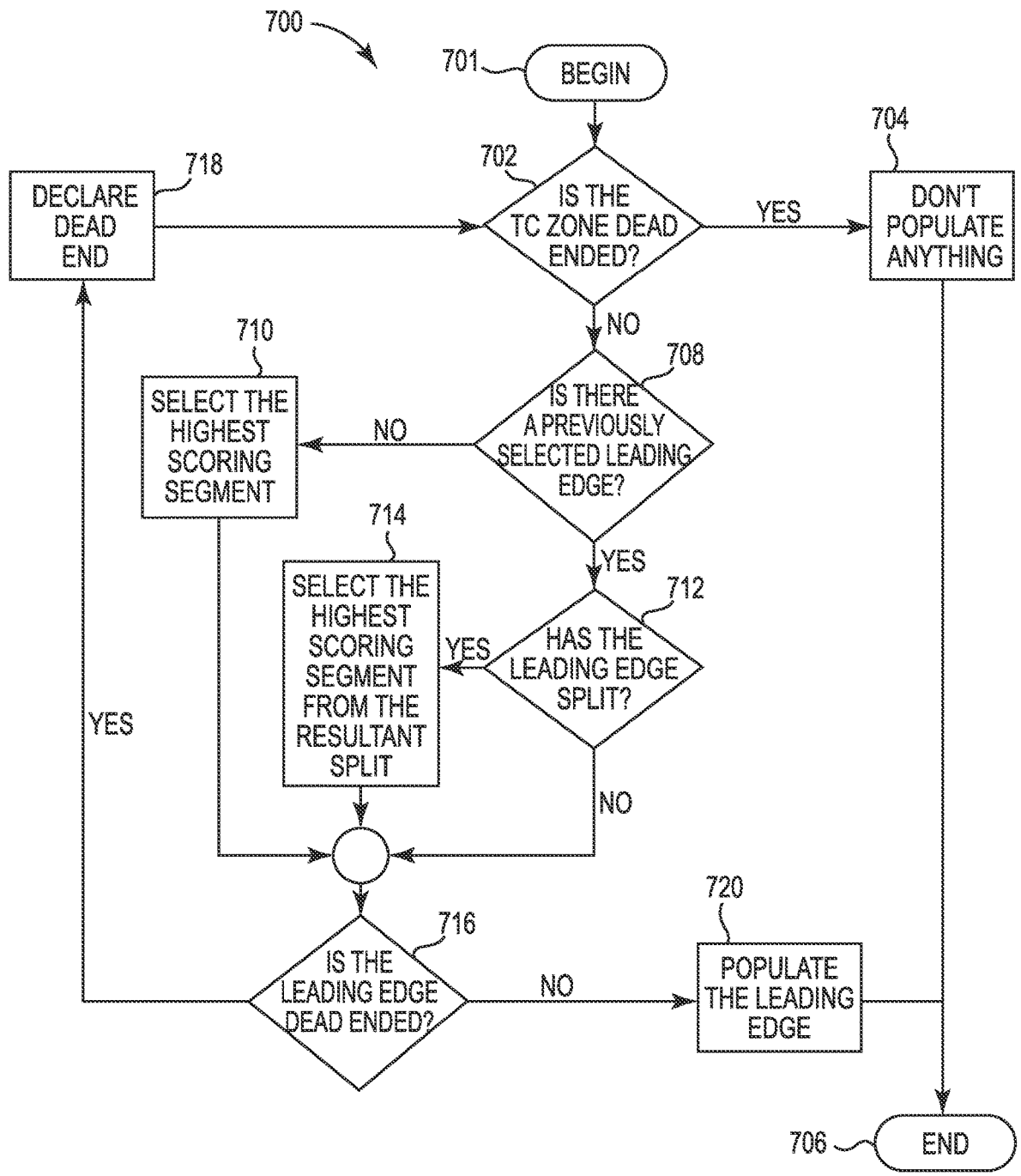
FIG. 7 illustrates an exemplary process that assists in preventing bifurcation or "splitting" of the travelling containment zone.

FIG. 7 is a flow chart illustrating a decision-making process 700 of the travelling containment zone (e.g., executed by the controller 120) in accordance with embodiments of the present disclosure. As described above, scoring values of relevant cells in the grid by the scanning function would be known before entry into this algorithm.

The process is entered at 701. At 702, it is determined, based upon the scanning function described elsewhere herein, whether the travelling containment zone is dead-ended. If the answer is yes, the process proceeds to 704, wherein no further cells are populated, after which the process exits at 706.

If the travelling containment zone is not dead-ended at 702, the process may next determine whether there is a previously selected leading edge of the travelling containment zone at 708. If the answer is no, the process may select the highest scoring segment in which to establish the leading edge of the travelling containment zone at 710 after which the process proceeds to 716. At 716, the process evaluates whether the leading edge is dead-ended. If the answer is yes, the process declares a dead-end at 718 and returns to 702. If, however, the leading edge is not determined to be dead-ended at 716, the process proceeds to populate the leading edge at 720, after which the process ends.

If, on the other hand, the answer is yes at 708, the process may next determine if the leading edge has bifurcated or split at 712. If the answer at 712 is no, the process may process directly to 716. If, however, the answer at 712 is yes, the process may first select the highest scoring segment from the split at 714 before proceeding to 716.

The populator function/algorithm may only be active during times that the travelling containment zone is travelling (both leading edge and trailing edge are moving) or filling (a stage where the travelling containment zone is initially growing to the desired size as shown, for example, in FIGS. 6A and 6B).

In some embodiments, the "score" of a relevant cell as determined by the scanning function may be an aggregate score that depends on different factors. For example, one sub-score value may be based upon the wavefront grid value as described above, while a secondary sub-score value may be based upon, for example, a distance of the particular cell from a centroid or other geometric feature of the current travelling containment zone. These sub-scores may then be summed (ensuring that units or weights of the respective sub-scores are consistent) to yield the total cell score used in the decision-making algorithm. Moreover, while the entire leading edge may be scored by the scanning function, the controller 120 may only populate (e.g., add cells to the travelling containment zone) a portion, for example, the top 20%-50%, (30% in one embodiment), of the cells along the leading edge.

Like the populator function, the depopulator is only active during certain times, i.e., when the travelling containment zone is travelling (both leading and trailing edges are moving) or emptying (a stage where the travelling containment zone is contracting such as at a dead-end as indicated in FIG. 6E). In some embodiments, the depopulator function may simply analyze the entire border of the travelling containment zone and remove a portion of the "oldest" cells therein, e.g., the oldest 40%-60%. However, in other embodiments, the depopulator function could also evaluate individual "segments" in a manner similar to the populator function in an effort to more efficiently remove cells from the travelling containment zone.

Moreover, as with the populator function, the depopulator function could utilize a scoring algorithm (e.g., evaluated during the scanning function/phase) to calculate various cell sub-scores. For example, in addition to cell "age" within the travelling containment zone, the scoring algorithm could sub-score each cell on a distance of the cell from the centroid or other geometric feature of the current travelling containment zone. Once again, the sub-scores may be added to obtain an overall cell score for depopulation.

The concept of depopulation is an iterative process that seeks to remove a target number of cells equivalent to those added by the populator function when the travelling containment zone is moving, and remove an arbitrary target number of cells when the travelling containment zone is emptying (when the travelling containment zone is filling, the depopulator function may be inactive until the zone reaches the desired size, and which point the depopulator may actively remove cells).

While described herein in the context of a single mowing session, the mower 100 may be unable to complete mowing of the entire work region in a single session without exhausting its battery. Accordingly, the controller 120 may log positional data at all times and store such data regarding which areas were mowed and what time they were mowed. As a result, the mower may suspend cutting when the battery needs recharging, and then subsequently resume cutting (after charging) in the same area where cutting was previously suspended.

As shown in FIGS. 2, 4, and 6A, the mower system may also include the base station 220 that may be located in or near the work region. The base station may house the mower 100 between mowing sessions and permit the mower battery to recharge. In some embodiments, some aspects of the mower controller could be incorporated into the base station. For example, the base station 220 may, in addition or alternatively, incorporate the controller 120. In this instance, the base station 220 may be able to wirelessly and bidirectionally communicate with the mower (e.g., via Wi-Fi) to receive data from, and provide data to, the mower.

The complete disclosures of the patent documents and other various publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method of operating an autonomous working vehicle within a predefined work region, the method comprising:
    defining, with an electronic controller associated with the working vehicle, a travelling containment zone that lies at least partially within the work region, the travelling containment zone defining a zone area that is less than an area of the work region;
    autonomously operating the working vehicle within the travelling containment zone;
    constraining a position of the working vehicle to be within the travelling containment zone; and
    moving the travelling containment zone across the work region while the working vehicle operates within the travelling containment zone,
    wherein moving the travelling containment zone comprises: adding a portion of the work region located adjacent a leading edge of the travelling containment zone to the zone area; and removing a portion of the zone area located adjacent a trailing edge of the travelling containment zone from the zone area.

2. The method of claim 1, wherein the working vehicle is a lawn mower.

3. The method of claim 1, wherein the work region comprises a grass surface of a property.

4. The method of claim 1, further comprising varying a shape of the travelling containment zone as the travelling containment zone moves across the work region.

5. The method of claim 1, further comprising moving the working vehicle in a random manner within the travelling containment zone.

6. The method of claim 1, further comprising controlling a steering angle and a ground speed of the working vehicle with the controller.

7. The method of claim 1, further comprising maintaining an initial position of the travelling containment zone for a period of time before moving the travelling containment zone across the work region.

8. The method of claim 1, further comprising estimating, with the controller, a time at which the working vehicle will have travelled over an entirety of the work region.

9. The method of claim 1, further comprising either: maintaining the zone area of the travelling containment zone constant as the travelling containment zone moves across the work region; or varying the zone area of the travelling containment zone as the travelling containment zone moves across the work region.

10. The method of claim 1, further comprising either: maintaining a speed of the working vehicle while operating the working vehicle within the travelling containment zone; or varying the speed of the working vehicle while operating the working vehicle within the travelling containment zone.

11. The method of claim 1, wherein moving the travelling containment zone comprises moving the travelling containment zone at either a constant rate or a variable rate.

12. A mowing system comprising an autonomously operating mower configured to cut grass within a work region as the mower travels about the work region, the system comprising:
    a chassis supported upon a grass surface by ground support members, wherein one or more of the ground support members comprises a drive member;
    a grass cutting element carried by the chassis;
    one or more motors configured to power the cutting element and the drive member; and
    an electronic controller configured to control an operation of the cutting element and a speed and a direction of the mower;
    wherein the controller is further configured to: define a travelling containment zone located at least partially within the work region, the travelling containment zone comprising a zone area that is less than an area of the work region; constrain operation of the mower to be within the travelling containment zone; and, while the mower is operating therein, move the travelling containment zone across the work region by advancing a leading edge and a trailing edge of the travelling containment zone.

13. The system of claim 12, wherein the controller maintains an initial position of the travelling containment zone for a period of time before the travelling containment zone travels across the work region.

14. The system of claim 12, wherein the mower further comprises a positioning system configured to estimate a position of the mower within the work region, the positioning system operatively connected to the controller.

15. The system of claim 12, wherein the system further comprises a base station located in or near the work region.

16. A method of operating an autonomous working vehicle within a predefined work region, the method comprising:
defining, with an electronic controller associated with the working vehicle, a travelling containment zone that lies within the work region, wherein the work region bounds a first plurality of grid cells and the travelling containment zone bounds a second plurality of grid cells, the second plurality of grid cells being less than, and a subset of, the first plurality of grid cells;
autonomously operating the working vehicle within the travelling containment zone;
constraining a position of the working vehicle to be within the travelling containment zone;
deciding, with the controller, a direction in which to advance a leading edge of the travelling containment zone; and
moving the travelling containment zone across the work region while the working vehicle operates within the travelling containment zone, wherein moving the travelling containment zone comprises: adding grid cells located outside of, and adjacent to, the leading edge of the travelling containment zone to the travelling containment zone; and advancing a trailing edge of the travelling containment zone by removing grid cells located inside of the travelling containment zone adjacent to the trailing edge from the travelling containment zone.

17. The method of claim 16, wherein deciding the direction to advance the leading edge of the travelling containment zone comprises scoring two or more grid cells of the first plurality of grid cells, the two or more grid cells being outside of, and adjacent to, the leading edge of the travelling containment zone.

18. The method of claim 17, wherein scoring the two or more grid cells comprises evaluating a wavefront grid value of each cell of the two or more grid cells.

19. The method of claim 17, wherein scoring the two or more grid cells comprises comparing a distance from each cell of the two or more grid cells to a centroid of the travelling containment zone.

20. The method of claim 16, further comprising detecting bifurcation of the leading edge into at least a first segment and a second segment upon contact of the leading edge with an exclusion zone contained within the work region.

21. The method of claim 20, further comprising replacing the leading edge with either the first segment or the second segment.

* * * * *